United States Patent
Iwaji et al.

(10) Patent No.: US 6,650,081 B2
(45) Date of Patent: Nov. 18, 2003

(54) SYNCHRONOUS MOTOR DRIVING SYSTEM

(75) Inventors: Yoshitaka Iwaji, Hitachi (JP);
Tsunehiro Endo, Hitachiota (JP);
Kiyoshi Sakamoto, Hitachi (JP);
Yuhachi Takakura, Oyama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/099,590

(22) Filed: Mar. 13, 2002

(65) Prior Publication Data

US 2003/0052640 A1 Mar. 20, 2003

(30) Foreign Application Priority Data

Aug. 9, 2001 (JP) ........................................ 2001-241858

(51) Int. Cl.$^7$ ................................ H02P 1/46; H02P 5/28
(52) U.S. Cl. ........................ 318/700; 318/138; 318/254; 318/439; 318/716; 318/721; 318/722; 318/723; 318/724
(58) Field of Search ................................ 318/138, 254, 318/439, 700, 721, 716, 722, 723, 724

(56) References Cited

U.S. PATENT DOCUMENTS

| | | | | |
|---|---|---|---|---|
| 5,635,810 A | * | 6/1997 | Goel | 318/719 |
| 6,005,365 A | * | 12/1999 | Kaneko et al. | 318/700 |
| 6,081,093 A | * | 6/2000 | Oguro et al. | 318/807 |
| 6,208,109 B1 | * | 3/2001 | Yamai et al. | 318/716 |
| 6,242,882 B1 | * | 6/2001 | Kaneko et al. | 318/700 |
| 6,396,229 B1 | * | 5/2002 | Sakamoto et al. | 318/439 |
| 6,462,492 B1 | * | 10/2002 | Sakamoto et al. | 318/254 |

FOREIGN PATENT DOCUMENTS

| JP | 06-153526 | 5/1994 |
|---|---|---|
| JP | 07-245981 | 9/1995 |
| JP | 08-019263 | 1/1996 |
| JP | 08-308286 | 11/1996 |
| JP | 2000-236694 | 8/2000 |

OTHER PUBLICATIONS

Kiyoshi Sakamoto et al., "A New Position Sensorless Control of Interior Permanent Magnet Synchronous Motor using Direct Position Error Estimation", Spec–00–67, Nov. 2000, pp. 73–77.

Hidehiko Sugimoto, "Theory and Designing Practice of AC Servo System", Sogo Denshi Publishing, May 1990. pp. 78–79.

Yoji Takeda et al., "Comparison of Control Characteristics of Permanent Magnet Synchronous Motors with Several Rotor Configurations", T IEE Japan, vol. 114–D, No. 6, '94, pp. 662–667.

* cited by examiner

Primary Examiner—Robert E. Nappi
Assistant Examiner—Tyrone Smith
(74) Attorney, Agent, or Firm—Hogan & Hartson, LLP

(57) ABSTRACT

Axial error calculation unit is provided for estimating an axial error $\Delta\theta$ between a d-q axis and a dc-qc axis by using Ld, Lq, Ke, Id*, Iq*, Idc and Iqc in a range of all rotational speeds except zero of a rotational speed command of a synchronous motor, Ld denoting an inductance on a magnetic pole axis d of the synchronous motor, Lq an inductance on a q axis orthogonal to the magnetic pole axis d, Ke a generated power constant of the motor, Id* a current command of the d axis, Iq* a current command on a q axis, Idc a detected current value on an assumed dc axis on control, and Iqc a detected current value on an assumed qc axis orthogonal to the assumed dc axis. Irrespective of presence of saliency, position sensorless control can be achieved in a wide range a low to high speed zone.

26 Claims, 15 Drawing Sheets

SYNCHRONOUS MOTOR DRIVING SYSTEM

BACKGROUND OF THE INVENTION

1. Field of the Invention

The present invention relates to a synchronous motor driving system, and more particularly, it relates to a control method for achieving a highly precise and high-performance synchronous motor driving system without using any sensors for detecting a rotational speed of a synchronous motor and a position of a magnetic pole.

2. Description of the Related Art

Many developments have been made for a method for controlling a synchronous motor without detecting the rotational speed of the synchronous motor and the position of a magnetic pole. Such control methods are usually classified into two types.

A first type is a control method based on speed/position sensor vector control of the synchronous motor. Instead of using the speed/position sensor, a magnetic pole position estimating instrument, and a speed estimating instrument are used. For example, a method is known, which is described in a document 1: "No. SPC-00-67: A New Position Sensorless Control of IPM Synchronous Motor using Direct Position Error Estimation", by inventors Kiyoshi Sakamoto, Yoshitaka Iwazi, and Tsunehiro Endo, in "IEEJ Semiconductor Power Conversion/Industrial Electric Power Application Joint Research Material" (November, 2000). This method is known as a vector control sensorless system.

A second type is a control method called a V/F control system, which controls the synchronous motor by an open loop.

In the case of the vector control sensorless system, except for non-presence of a position/speed sensor, a configuration itself of the control system is similar to that of a vector control system equipped with a sensor. Accordingly, a high-performance synchronous motor driving system can be achieved.

FIG. 15 shows a relation between a d-q coordinate axis and an assumed axis dc-qc by a vector with a magnetic pole axis of a synchronous motor set as a reference axis. For vector control, as shown in FIG. 15, a magnetic pole axis of the synchronous motor is set as a d axis, an axis orthogonal to the same as a q axis. Then, by properly controlling a voltage and a current applied to the synchronous motor on each axis, high-performance making utmost use of synchronous motor performance is achieved. According to this vector control sensorless system, torque can be made linear, and efficiency can be maximized.

In the case of the vector control sensorless system, a dc-qc axis is set by assuming a d-q axis on control, deviation (axial error) $\Delta\theta$ from a real d-q axis is estimated, and a dc-qc axial phase is adjusted to reduce the deviation to zero. Thus, in the case of the vector control sensorless system, a method of estimating an axial error $\Delta\theta$ is a most important factor for deciding control performance.

In well-known examples, several estimation methods of axial errors $\Delta\theta$ have been presented according to the rotational speed zones of the synchronous motor. In practice, all the speed zones are covered by using these control methods in association.

On the other hand, in the case of the V/F control system, no speed or current automatic adjustment units are provided, and a voltage to be applied to the synchronous motor is decided. As its conventional example, a control method is described in JP-A-2000-236694. In the case of the V/F control, different form the case of the vector sensorless system, a magnetic pole axis is not estimated. Thus, a configuration of a control system is greatly simplified. However, if a load is suddenly changed during driving, transient vibration may occur. In order to suppress such transient vibration, JP-A-2000-236694 presents a control system for correcting a speed based on a current detected value.

In the case of the vector control sensorless system, a sensorless system must be switched to another according to a driving speed of the synchronous motor. The method described in the document 1 estimates an axial error $\Delta\theta$ based on a speed electromotive voltage of the synchronous motor in principle, which can be achieved only in a middle/high speed zone. A similar problem is inherent in the method described in JP-A-8-308286.

On the other hand, as a sensorless system of a low speed, many methods have been presented, which uses a inductance difference (saliency) of the synchronous motor. For example, as described in JP-A-7-245981, there is a method for superposes a higher harmonic wave on a voltage command, and calculates an axial error based on a higher harmonic current component thus generated.

In this method, however, since it is necessary to superpose the higher harmonic wave, a pulsation component is generated in a synchronous motor current, causing a considerable reduction in efficiency of the synchronous motor. In addition, because of the superposed wave, electromagnetic noise is increased. Especially, to detect an axial error with high sensitivity, the amount of superposed waves to be injected must be increased, and thus it is difficult to solve the above-described problems, and achieve high control performance at the same time.

In addition, since the saliency of the synchronous motor is used, the system cannot be applied to a synchronous motor of a non-saliency type. Further, when the low-speed system, and the middle/high speed system are used in association, the systems must be switched according to a speed, and thus shocks occur following the switching.

On the other hand, in the case of the V/F control, the synchronous motor can be driven from a low to high speed zone by a configuration of a single control system.

However, in the V/F control, since the d-q axis in the synchronous motor is not basically coincident with the dc-qc axis on control, it is difficult to achieve high-performance control. For example, it is difficult to achieve high-speed response to a change in a rotational speed command, linear control of torque, maximum efficiency control and the like. Accordingly, there is a possibility that external disturbances such as fluctuation in load torque may cause inconveniences such as vibration or excessive current.

SUMMARY OF THE INVENTION

An object of the present invention is to provide a synchronous motor driving system equipped with means for stabilizing a control system without superposing any higher harmonic waves, controlling a low-speed zone to a high-speed zone by a continuous method, and achieving a vector control sensorless system.

The foregoing object of the present invention can be achieved by providing means for calculating an error $\Delta\theta$ as deviation between a magnetic pole axis in a synchronous motor and a magnetic pole axis on control, as a function of a driving current command, a detected current value, an inductance constant, and generated power constant of the synchronous motor, calculating an axial error by applying the axial error calculating means to all speed zones of the synchronous motor except zero, and correcting the magnetic pole axis on the control based on the axial error.

That is, in order to achieve object, in accordance with the present invention, there is provided a synchronous motor driving system which comprises a synchronous motor, an inverter for driving the synchronous motor, a rotational speed command generator for supplying a rotational speed command to the synchronous motor, and a control unit for calculating a voltage applied to the synchronous motor, said synchronous motor driving system comprising axial error calculation means for estimating an axial error $\Delta\theta$ between a d-q axis and a dc-qc axis by using Ld, Lq, Ke, Id*, Iq*, Idc and Iqc in a range of all rotational speeds except zero of the rotational speed command of the synchronous motor wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, Idc is a detected current value on an assumed dc axis on control, and Iqc is a detected current value on an assumed qc axis orthogonal to the assumed dc axis; and means for adjusting the dc-qc axis to the d-q axis based on the calculated value of the axial error $\Delta\theta$.

Furthermore, in order to achieve the above object, in accordance with the present invention, there is provided a synchronous motor driving system which comprises a synchronous motor, an inverter for driving the synchronous motor, a rotational speed command generator for supplying a rotational speed command to the synchronous motor, and a control unit for calculating a voltage applied to the synchronous motor, said synchronous motor driving system comprising axial error calculation means for estimating an axial error $\Delta\theta$ as a function of an inductance L and a generated power constant Ke among the resistance R, the inductance L and a generated power constant Ke as synchronous motor constants of the synchronous motor in a range of all rotational speeds except zero of a rotational speed command of the synchronous motor; and means for adjusting the dc-qc axis to the d-q axis based on the calculated value of the axial error $\Delta\theta$, wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis Iq*, Idc is a detected current value on an assumed dc axis on control, and Iqc is a detected current value on an assumed qc axis orthogonal to the assumed dc axis.

The axial error calculation means can be adapted to calculate an axial error $\Delta\theta$ by using current commands Id* and Iq* on the d-q axis, and detected current values Idc and Iqc on the dc-qc axis, wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, Idc is a detected current value on an assumed dc axis on control, and Iqc is a detected current value on an assumed qc axis orthogonal to the assumed dc axis.

In this case, instead of the detected current value Idc on the dc axis, a current command Id* can be used.

In addition, the synchronous motor driving system may be provided with means for detecting a DC current on a power source side of the inverter, and synchronous motor current estimating means for estimating an AC current of the synchronous motor based on the detected DC current and a driving pulse signal for driving the inverter, and the axial error $\Delta\theta$ may be calculated using the estimated current as a detected current value.

The synchronous motor driving system can be provided with means for detecting a DC current on a power source side of the inverter, and Iqc estimating means for estimating a current value on the qc axis of the synchronous motor based on the detected DC current, and a detected value or a set value of a DC voltage of the inverter, and the axial error $\Delta\theta$ can be calculated using the estimated current as a detected current value.

In any of the above-described synchronous motor driving systems, in the calculation of the axial error $\Delta\theta$, a correction term may be provided to make correction in accordance with a rotational speed command of the synchronous motor, and the correction term may be set as a function of weight which increases as the rotational speed command approaches zero.

The current command Iq* on the q axis can be made based on the detected current value or the estimated value on the qc axis.

The synchronous motor driving system can be provided with means for estimating a speed deviation between the rotational speed command and a real rotational speed based on the calculated value of the axial error $\Delta\theta$, and the q axis current command Iq* of the synchronous motor can be made based on the estimated value of the speed deviation.

The synchronous motor driving system may be provided with means for estimating a rotational speed of the synchronous motor based on the calculated value of the axial error $\Delta\theta$, and the q axis current command Iq* of the synchronous motor may be made based on a deviation between the estimated value and the rotational speed command.

In the above-described synchronous motor driving systems of the three types, the current command Id* of the d axis can be made based on the current command Iq* of the q axis.

In the present invention, the synchronous motor may be a salient type or a non-salient type.

Other objects, features and advantages of the invention will become apparent from the following description of the embodiments of the invention taken in conjunction with the accompanying drawings.

DESCRIPTION OF THE EMBODIMENTS

Next, description will be made of the preferred embodiment of the synchronous motor driving system of the present invention with reference to FIGS. 1 to 15.

First Embodiment

Figure 1:
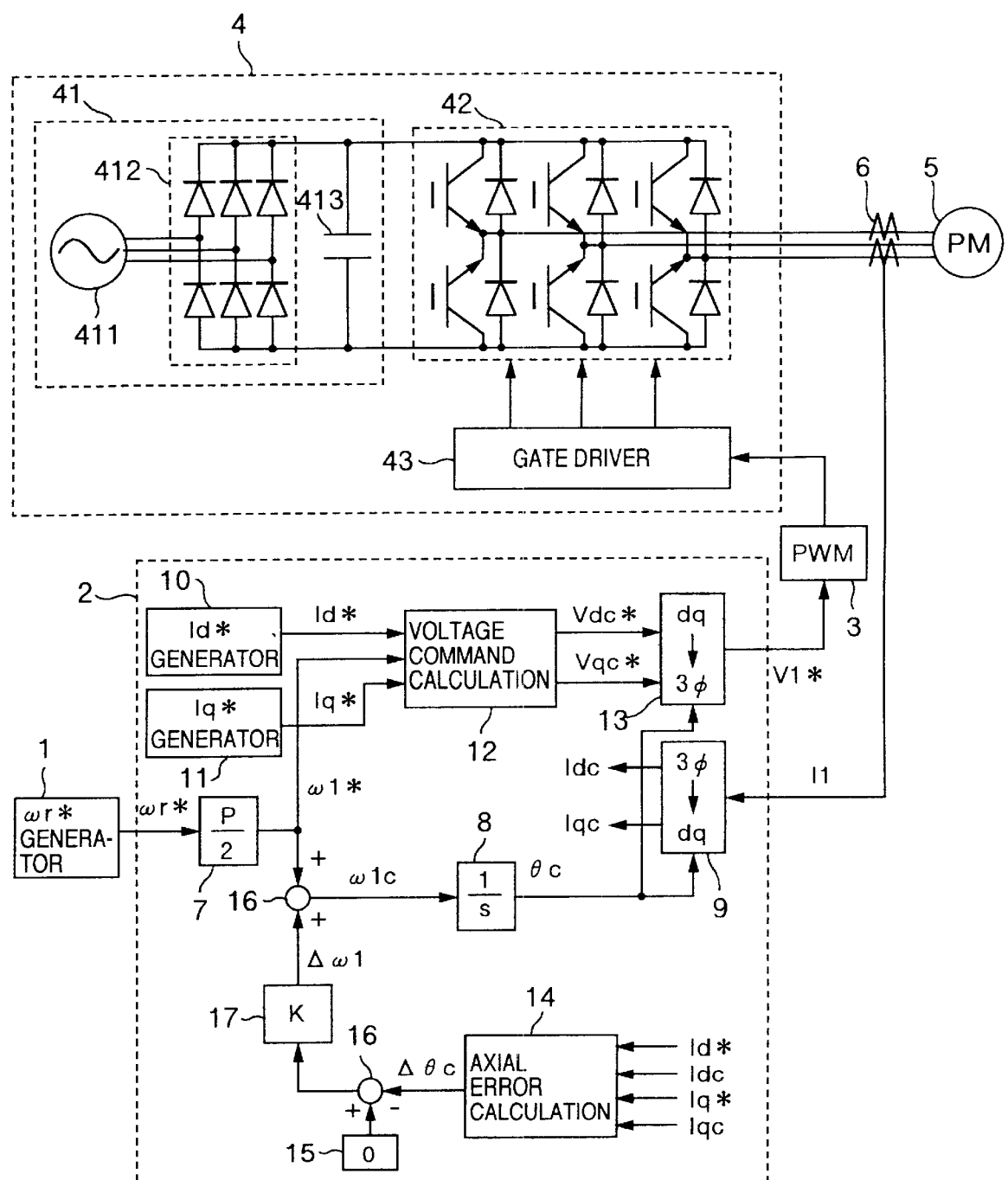
FIG. 1 is a block diagram showing a configuration of a synchronous motor driving system according to a first embodiment of the present invention.

FIG. 1 is a block diagram showing a configuration of a synchronous motor driving system according to a first embodiment of the present invention. The synchronous motor driving system of the first embodiment comprises the following elements: a rotational speed command generator 1 for supplying a rotational speed command $\omega r^*$ to the synchronous motor; a control unit 2 for calculating amplitude, a frequency and a phase of a voltage applied to the synchronous motor; a pulse width modulation (PWM) generation 3 for generating a pulse for driving an inverter 4 based on a voltage command $V1^*$; the inverter 4 for driving the synchronous motor: the synchronous motor 5 to be controlled; a current detector 6 for detecting a current of the synchronous motor 5; a conversion gain 7 for converting the rotational speed command $\omega r^*$ into an electrical angle frequency command $\omega 1^*$ of the synchronous motor with P set as a pole; an integrator 8 for calculating an AC phase $\theta c$ in the control unit; a dq coordinate converter 9 for converting a current value on a three-phase AC axis into a component on a dc-qc axis as a rotation coordinate axis; an Iq* generator 10 for supplying a current command Id* of a d axis component of the synchronous motor; an Iq* generator 11 for supplying a current command Iq* of a q axis component (torque component) of the synchronous motor; a voltage command calculator 12 for calculating voltage commands Vdc* and Vqc* on a dc-qc axis based on $\omega 1^*$, Id* and Iq*; a dq reverse converter 13 for converting the voltage commands Vdc* and Vqc* on the dc-qc axis into values on the three-phase AC axis; an axial error calculator 14 for estimating an axial error between a d-q axis and a control axis dc-qc of the synchronous motor; a zero generator 15 for supplying a zero command to the axial error; an adder 16 for adding or subtracting a signal; and a magnetic pole axis estimation gain 17 for calculating an amount of correction to the electrical angle frequency command $\omega 1^*$ by using the axial error. The inverter 4 includes a DC power source unit 41 constituting a main circuit power source of the inverter 4, a main circuit unit 42 of the inverter, a gate driver 43 for generating a gate signal to the main circuit; a three-phase AC power source 411 for supplying power to the inverter 4, a diode bridge 412 for rectifying the three-phase AC power source, and a smoothing capacitor 413 for suppressing a pulsation component contained in a DC power supply.

Figure 2:
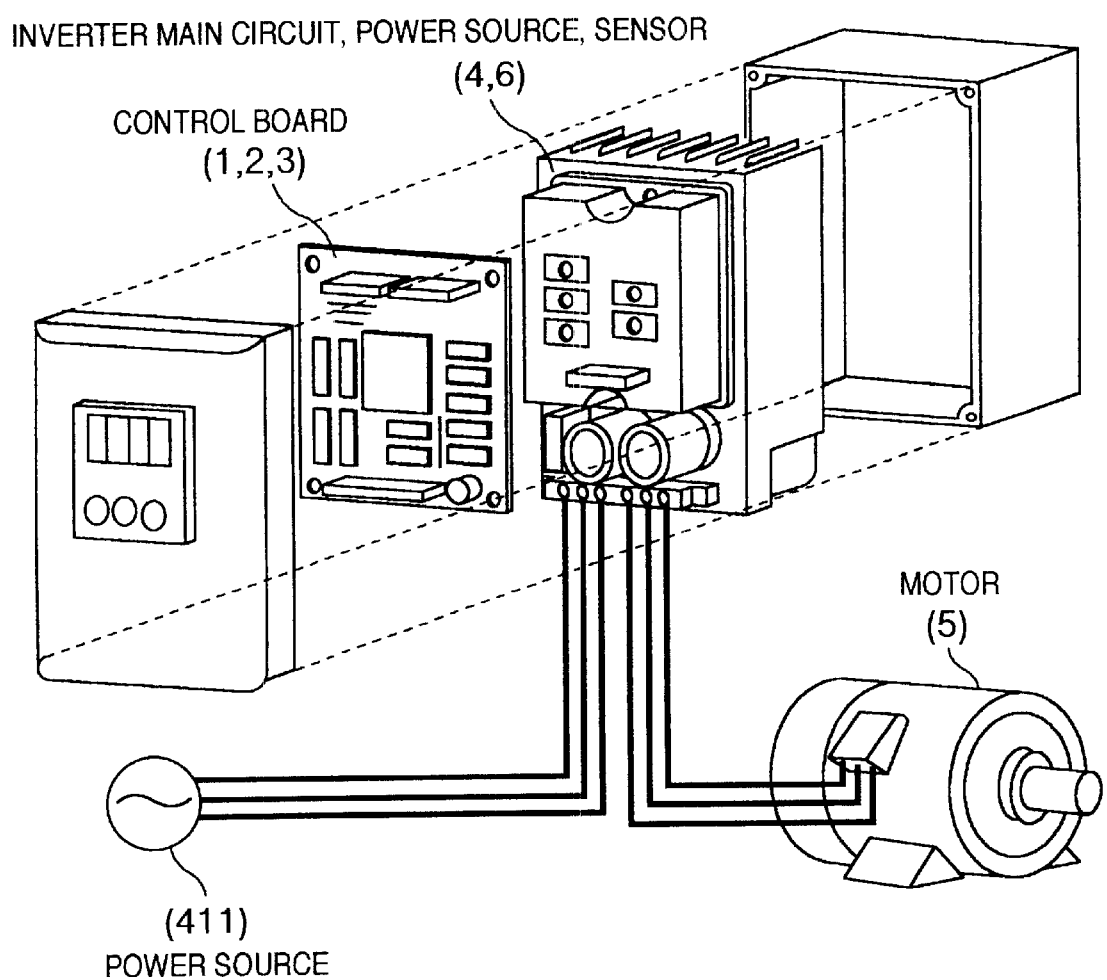
FIG. 2 is a perspective view showing a schematic structure of the synchronous motor driving system of the first embodiment.

FIG. 2 is a perspective view showing a schematic structure of the synchronous motor driving system of the first embodiment shown in FIG. 1. The synchronous motor driving system of the present invention mainly has an AC power source unit, a control/inverter unit, and a synchronous motor. As shown in FIG. 2, a control board includes the rotational speed command generator 1, the control unit 2, and the PWM generator 3, which are all shown in FIG. 1. Actually, the control board is a digital circuit around a micro-processor. Also, the inverter main circuit 4, the current detector 6 and the like are installed in one unit.

Next, description is made of an operation principle of the first embodiment by referring to FIG. 1. The conversion gain 7 calculates an electrical angle frequency $\omega 1^*$ of the synchronous motor based on a rotational speed command $\omega r^*$ from the rotational speed command generator 1, and outputs it.

On the other hand, in the axial error calculator 14, an axial error $\Delta\theta$ is estimated based on a current command and a detected current value. The magnetic pole axis estimation gain 17 calculates a speed correction amount $\Delta\omega 1$ based on the estimated axial error $\Delta\theta$. The adder 16 adds the $\omega 1^*$ and the $\Delta\omega 1$ together to obtain $\omega 1c$. The phase calculator 8 integrates the $\omega 1c$ to obtain an AC phase $\theta c$ in the control unit. As a result, the AC phase $\theta c$ is corrected by the $\Delta\theta c$. Then, by coordinate-converting the detected value of the three-phase AC current based on this $\theta c$, an Idc as a dc axis component, and an Iqc as a qc axis component are obtained. At the Id* generator 10 and the Iq* generator 11, current commands of respective axis components of the synchronous motor 5 are supplied. A method of generating the Id* and the Iq* will be described in detail later.

The voltage command calculator 12 calculates voltages Vdc* and Vqc* to be applied to the synchronous motor 5 based on the rotational speed $\omega 1^*$ and the current commands Id* and Iq* by an equation (2). In the equation, R: motor resistance, Ld: d axis inductance, Lq: q axis inductance, and Ke: generated power constant of motor.

$$V_{dc}^* = R \cdot I_d^* - \omega_1 L_q \cdot I_q^*$$
$$V_{qc}^* = \omega_1 \cdot L_d \cdot I_d^* + R \cdot I_q^* + K_e \cdot \omega_1 \qquad \text{[Equation 2]}$$

The equation (2) is similar to a calculation equation used for normal vector control. The equation (2) is described, for example as an equation (4.6) in a document 2: p 78, "Theory and Designing Practice of AC Servo System", by Hidehiko Sugimoto, Sogo Denshi Publishing (May, 1990).

The dq reverse converter 13 coordinate-converts the voltages Vdc* and Vqc* obtained by the equation (2) into voltage command values V1* on the three-phase AC axis. Then, at the PWM generator 3, a voltage command V1* is converted into a pulse width. The gate driver 43 drives a switching element based on this pulse signal, and applies a voltage equal to each of the voltages Vdc* and Vqc* to the synchronous motor 5.

Figure 3:
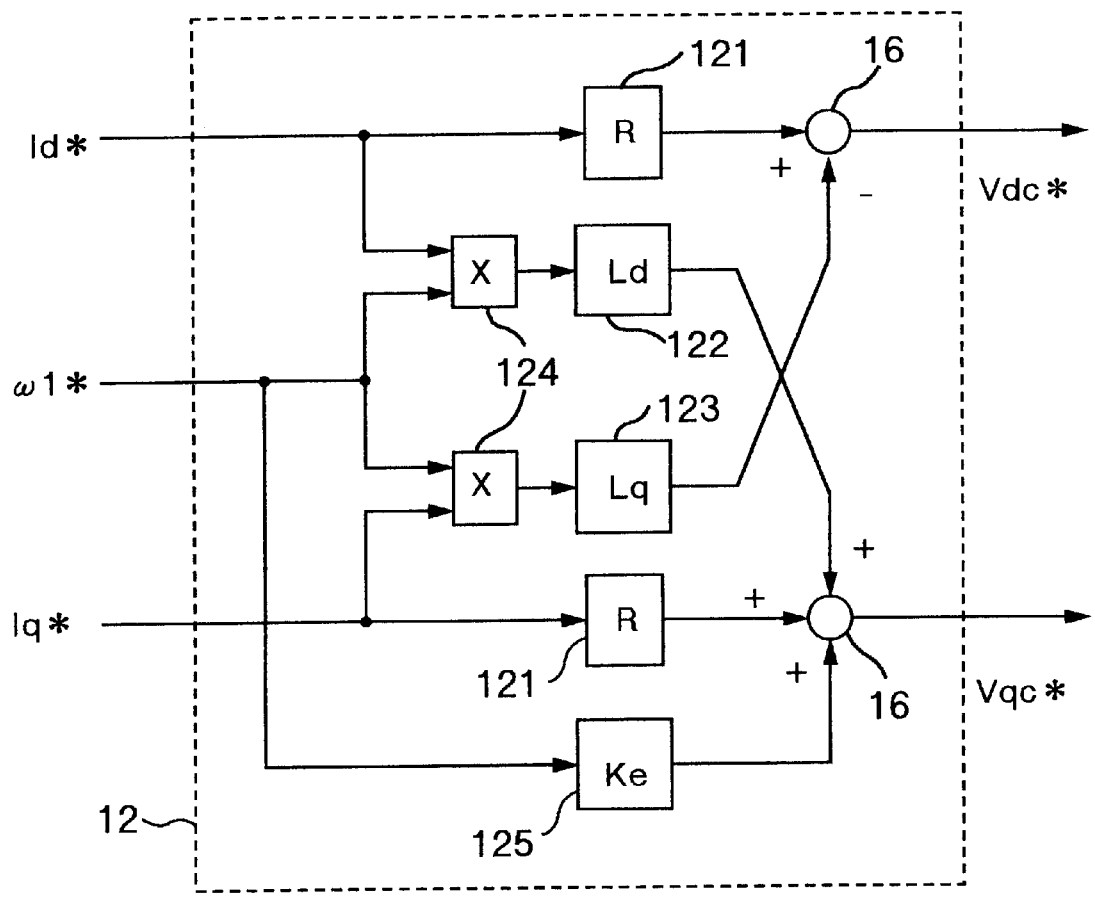
FIG. 3 is a block diagram showing an internal configuration of a voltage command calculator 12 in the synchronous motor driving system of the first embodiment of the present invention.

FIG. 3 is a block diagram showing an internal configuration of the voltage command calculator 12 in the synchronous motor driving system of the first embodiment of the present invention. The voltage command calculator 12 includes a gain 121 equivalent to a resistance value (R) of the synchronous motor, a gain 122 equivalent to a d axis inductance (Ld), a gain 123 equivalent to a q axis inductance (Lq), a multiplier 124, and a gain 125 equivalent to a generated power constant (Ke).

As shown in the equation (2) and FIG. 3, a voltage command is calculated by using constants R, Ld, Lq and Ke of the synchronous motor. If these constants of the synchronous motor are accurate, then the synchronous motor is driven at a rotational speed indicated by a command value, and a current value.

By the axial error calculator 14, and the magnetic pole axis estimation gain 17, a phase locked loop (PLL) is formed and, by correcting the ω1*, a phase angle θc is corrected. As a result, an axial error Δθ is controlled to zero. Control response time for converging the axial error to zero is decided by set response by the magnetic pole axis estimation gain 17. In addition, the magnetic pole axis estimation gain may be a proportional gain in the case of the configuration of the control system of FIG. 1.

Next, description is made of an operation of the axial error calculator 14 as a feature of the present invention. According to the document 1, an axial error Δθ can be calculated by an equation (3) using a voltage command, a detected current value, and a constant of the synchronous motor.

[Equation 3]

$$\Delta\theta = \tan^{-1}\frac{V_{dc}^* - R \cdot I_{dc} + \omega_1 L_q \cdot I_{qc}}{V_{qc}^* - R \cdot I_{qc} - \omega_1 L_q \cdot I_{dc}}$$

Codes Vdc* and Vqc* in the equation (3) represent parameters shown in the equation (2), both of which strongly depend on an electrical angle frequency ω1. If Id* and Iq* are constant, then Vdc* and Vqc* are changed substantially in proportion to ω1*. Thus, when the ω1* is near zero, a denominator/numerator of the equation (3) approaches zero, causing a considerable reduction in calculation accuracy.

When the ω1* is near zero, dependence of a term of resistance R is increased. Since the resistance R is strongly affected by temperature dependence, nonlinearity by a semiconductor device, or the like, accurate setting of the resistance R is difficult, making it impossible to establish the equation (3). Consequently, it is very difficult to estimate an axial error in a wide speed range by using the equation (3). An equation (4) is obtained by substituting the equation (2) for the equation (3), and arranging it.

[Equation 4]

$$\Delta\theta = \tan^{-1}\frac{\omega_1 L_q (I_{qc} - I_q^*) - R(I_{dc} - I_d^*)}{K_e \cdot \omega_1 - \omega_1(L_q I_{dc} - L_d I_d^*) - R(I_{qc} - I_q^*)}$$

In a denominator/numerator of the equation (4), it can be seen that there are two types of terms, i.e., for ω1 and R.

An R term of the numerator (=−R(Idc−Id*)) indicates an amount of voltage reduced according to deviation between Idc and Id*. The Id is normally controlled to zero in the synchronous motor of a non-salient type. Also, in the case of that of a salient type, in a stationary state, changes only occur in a range of 20 to 30% of synchronous motor rating. Thus, the amount of reduced voltage of this term becomes a small value of about 1% or lower, which can be ignored.

An R term of the denominator (=−R(Iqc−Iq*)) indicates a voltage reduction of 1% or lower even in rated current, which can be ignored substantially in all speed range compared with a term of Ke·ω1. Moreover, as higher efficiency is strongly demanded for the synchronous motor in recent years, the resistance R of the synchronous motor tends to be designed smaller and smaller.

For the above-described reasons, by ignoring the R term in the equation (4), the equation (4) can be simplified to be an equation (5). That is, assuming that a d axis inductance is Ld[H], a q axis inductance Lq[H], a generated power constant of the motor Ke[Wb], a current command value of a magnetic pole d axis Id*, a current command on a q axis orthogonal to the magnetic pole d axis Iq*, a detected current value on the assumed dc axis of the magnetic pole axis Idc, and a detected current value on the qc axis orthogonal to the dc axis Iqc, an axial error Δθ is calculated by the equation (5) using the current commands Id* and Iq* on the d-q axis, and the detected current values Idc, Iqc on the dc-qc axis.

[Equation 5]

$$\Delta\theta = \tan^{-1}\frac{L_q(I_{qc} - I_q^*)}{K_e - (L_q I_{dc} - L_d I_d^*)}$$

In the equation (5), the ω1 term is cancelled, no electrical angle frequencies are present, and an axial error Δθ can be calculated. As the resistance of the equation (4) is ignored, an estimation error is generated in a very low speed zone of 1 to 2% or lower. However, it can be detected whether there is an axial error. Even if there is a small estimation error, since an axial error Δθ can be reduced to zero at the end, a vector control sensorless system can be achieved in a range of substantially all speeds.

In the very low speed zone of 1 to 2% or lower, estimation of an axial error is inevitably difficult. Thus, for example, it is impossible to output rated torque at a zero speed. However, passage can be allowed through the very low speed zone during acceleration/deceleration of the synchronous motor.

Figure 4:
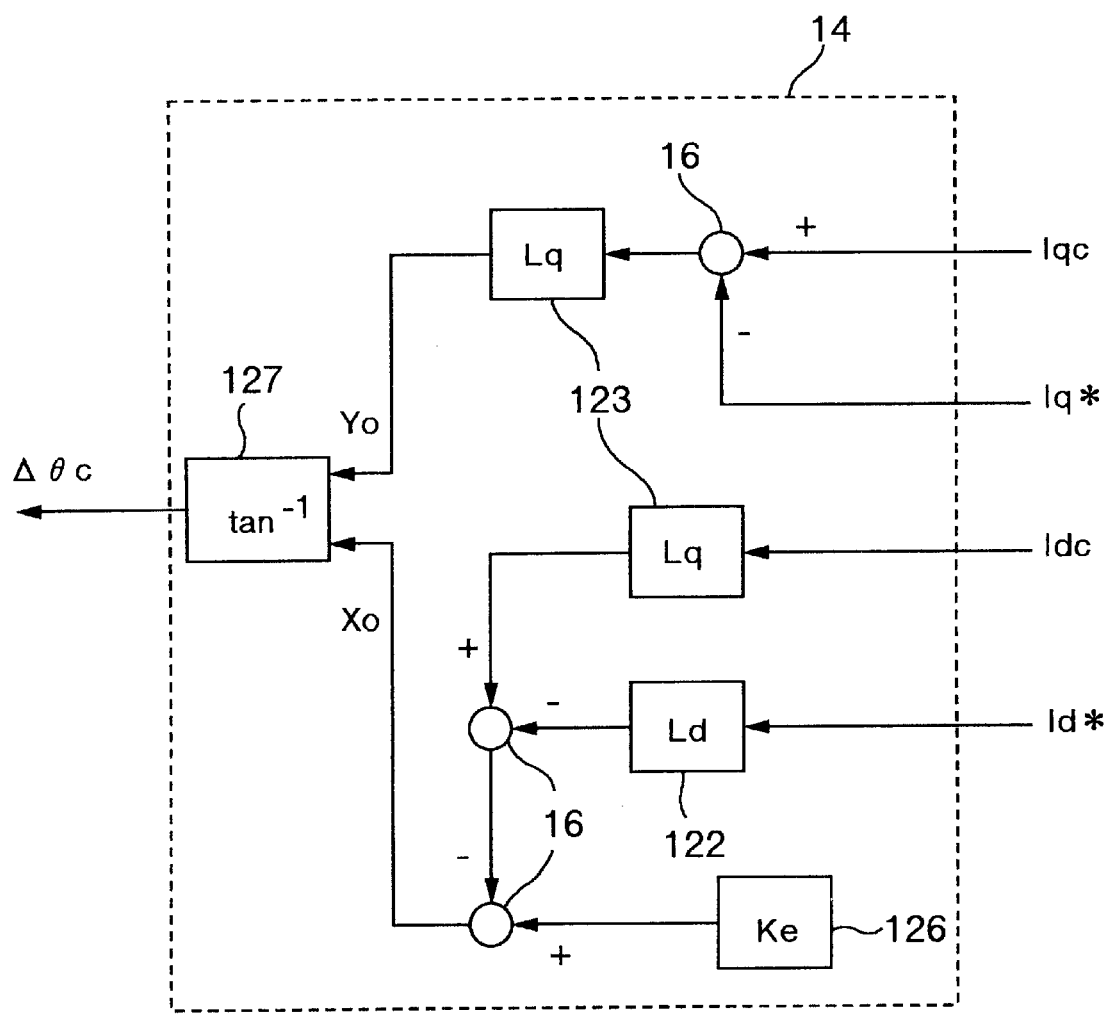
FIG. 4 is a block diagram showing an internal configuration of an axial error calculator 14 in the synchronous motor driving system of the first embodiment of the present invention.

FIG. 4 is a block diagram showing an internal configuration of the axial error calculator 14 in the synchronous motor driving system of the first embodiment of the present invention. That is, FIG. 4 shows the configuration of the axial error calculator 14 using the equation (5). The axial error calculator 14 includes a generated power constant setter 126, and an arc tangent calculator 127.

The generated power constant setter 126 outputs a generated power constant (Ke), and the arc tangent calculator 127 calculates an arc tangent of Y0/X0 for two inputs X0 and Y0. As shown in FIG. 4, by entering current commands Id* and Iq*, and detected current values Idc and Iqc, it is possible to calculate an axial error Δθ without any dependence on ω1.

In the equation (5), by using an approximation of tan(x)=x in a range of small x, an axial error can be calculated in approximation by an equation (6).

[Equation 6]

$$\Delta\theta = \frac{L_q(I_{qc} - I_q^*)}{K_e - (L_q I_{dc} - L_d I_d^*)}$$

In addition, in the case of the synchronous motor of the non-salient type, in the equation (5) or (6), by replacing Ld and Lq by one inductance, an axial error can be calculated more easily. In the case of the synchronous motor of the non-salient type, since Id is normally controlled to be zero, calculation can be simplified more by setting Id* to Id*=0 in each calculation equation.

Next, more detailed description is made of the equations (5) and (6) to simplify the axial error calculation equation more. Terms of numerators in both equations relate to a torque current Iq, and are greatly changed by load fluctuation or the like of the synchronous motor. In other words, it can be understood that the numerator terms greatly affect presence of axial errors and error directions (polarities).

On the other hand, terms of denominators relate to a generated power constant Ke and Id. A code Ke denotes a magnetic flux of a permanent magnet, which is larger than that generated by Id. Thus, Ke is dominant normally. Therefore, even if Id is slightly changed during transition, great fluctuation of a denominator value may be limited. Therefore, when priority is placed on simplicity of calculation rather than on precise axial error calculation, Id* can be used instead of Idc. In such a case, the equation (5) is changed to an equation (7).

[Equation 7]

$$\Delta\theta = \tan^{-1}\frac{L_q(I_{qc} - I_q^*)}{K_e - (L_q - L_d)I_d^*}$$

By using the equation (7), an axial error can be calculated more easily, making it possible to reduce a load on control calculation.

Second Embodiment

Figure 5:
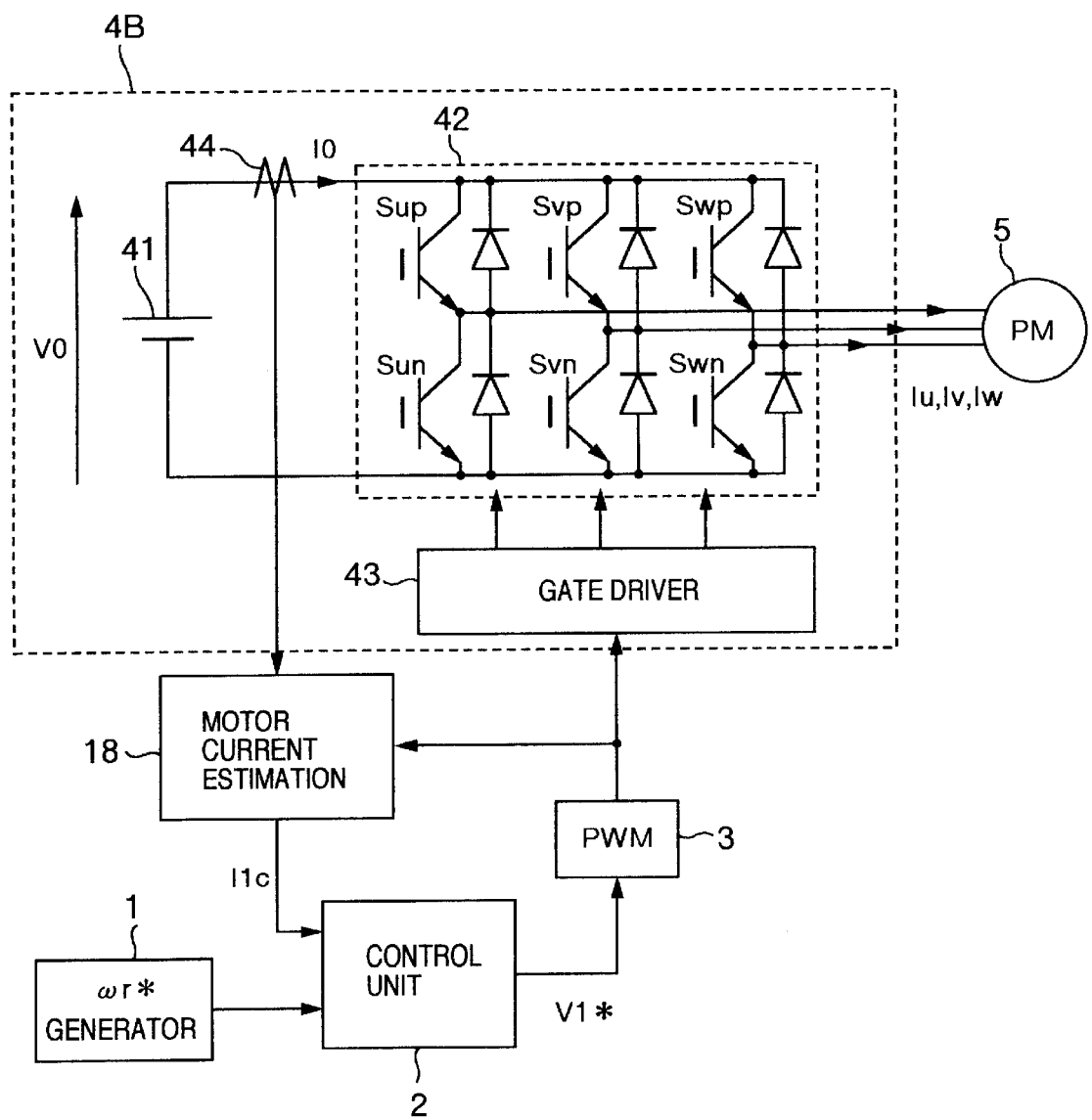
FIG. 5 is a block diagram showing a configuration of a synchronous motor driving system according to a second embodiment of the present invention.

FIG. 5 is a block diagram showing a configuration of a synchronous motor driving system according to a second embodiment of the present invention. The synchronous motor driving system of the second embodiment includes an inverter 4B, a DC current detector 44 for detecting a current I0 flowing from a DC power supply unit 41 to an inverter main circuit unit, and a synchronous motor current estimator 18 for estimating a synchronous motor current based on a detected value of the current I0.

In the second embodiment of FIG. 5, the current detector 6 is removed from the configuration of the system shown in FIG. 1, and instead the DC current detector 44, and the synchronous motor current estimator 18 are added. The DC current detector 44 detects a current by using HALL CT or shunt resistance. The synchronous motor current estimator 18 estimates a synchronous motor current based on the detected value of the current I0, and a pulse waveform outputted from a PWM generator 3.

A control unit 2 controls the synchronous motor by regarding an estimated value I1c as a detected current value of the synchronous motor. Thus, an operation of the control unit 2 itself is similar to that of the first embodiment.

Figure 6:
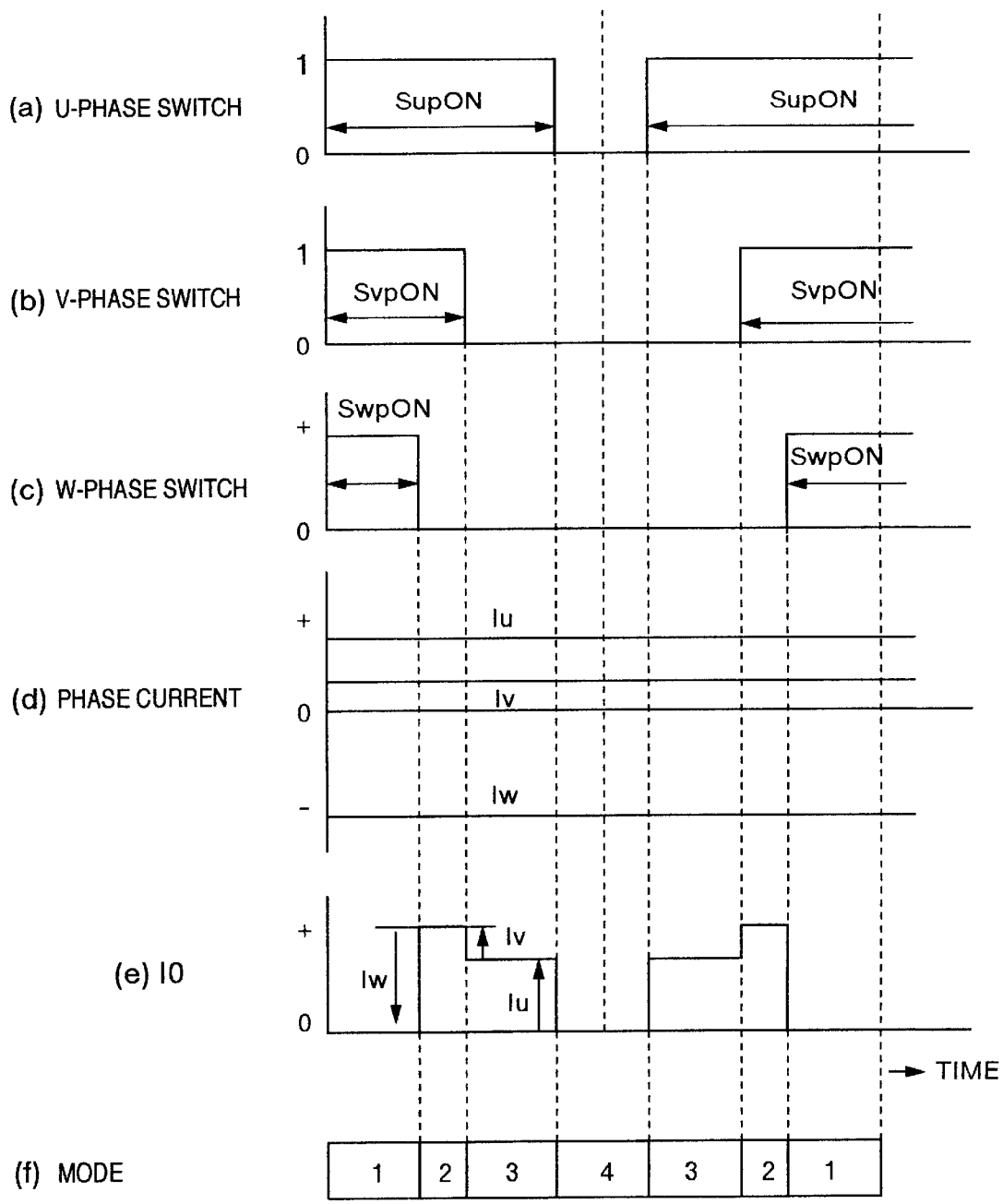
FIG. 6 is explanatory view showing an operation of a synchronous motor current estimator 18 in the synchronous motor driving system of the second embodiment of the present invention.

FIG. 6 is explanatory view showing an operation of the synchronous motor current estimator 18 in the synchronous motor driving system of the second embodiment of the present invention. In FIG. 6, each of (a) to (c) shows a PWM pulse waveform of each phase. At 1, a switch (Sup, Svp or Swp) of a plus side is turned ON and, at 0, a switch (Sun, Svn or Swn) of a minus side is turned ON.

Now, assuming that a synchronous motor current is similar to that shown in FIG. 6(d), the DC current I0 of the inverter has a waveform similar to that shown in FIG. 6(e). For the waveform of FIG. 6(e), there are four modes described below.

(1) Mode 1:
  Sup=ON, Svp=ON, Swp=ON→I0=0
(2) Mode 2:
  Sup=ON, Svp=ON, Swp=OFF→I0=Iu+Iv=−Iw
(3) Mode 3:
  Sup=ON, Svp=OFF, Swp=OFF→I0=Iu
(4) Mode 4:
  Sup=OFF, Svp=OFF, Swp=OFF→I0=0

Thus, Iu can be detected if the DC current I0 is detected in the switching state of the mode 3 and, in the state of the mode 2, Iw can be detected. Iv may be calculated based on Iu and Iw. A basic operation of the synchronous motor current estimator is similar to that of a method disclosed in, for example JP-A-6-153526 or JP-A-8-19263.

However, there was a big problem when this synchronous motor current estimator was used for the conventional vector control sensorless system. As described above, in order to achieve the vector control sensorless system in a low-speed zone, the method using the saliency of the synchronous motor, i.e., the method of estimating an axial error from a higher harmonic wave component of a current by superposing a higher harmonic wave on a voltage, is only available. Thus, it was necessary to accurately detect a higher harmonic wave flowing to the synchronous motor.

In the configuration of the control system of FIG. 5, as shown in FIG. 6, because of dependence of a timing for current detection on a state of the PWM pulse, it is difficult to accurately detect a higher harmonic wave component in a current. A basic wave component can be detected without any problems, since a frequency is sufficiently lower compared with a PWM pulse frequency. Accordingly, detection of the higher harmonic wave is a problem. To increase accuracy of detection, improvements such as an increase in the amount of superposing a higher harmonic wave, or a reduction in a frequency of the superposed wave. Either case may reduce efficiency, causing a great increase in noise.

On the other hand, in the axial error calculation of the present invention, it is not necessary to superpose any higher harmonic waves and, by using the equation (5) or (6), accurate axial error calculation is possible in substantially all speed zones. Therefore, a high-performance can be expanded to substantially all the zones.

Third Embodiment

The above-described second embodiment enables the number of current sensors to be reduced, and thus provides an advantage of simplifying the configuration of the control system. However, the following problems are inherent. That is, when a rotational speed of the synchronous motor is low, and an output voltage is small, the periods of the modes 2 and 3 shown in FIG. 6 become short, necessitating reading of a very narrow pulse-like current. Waveforms in FIG. 6 are for principle explanation, and I0 represents a staircase having no vibration. In practice, however, ringing is superposed in a current waveform following switching. If a pulse width is narrow, this effect cannot be ignored.

Figure 7:
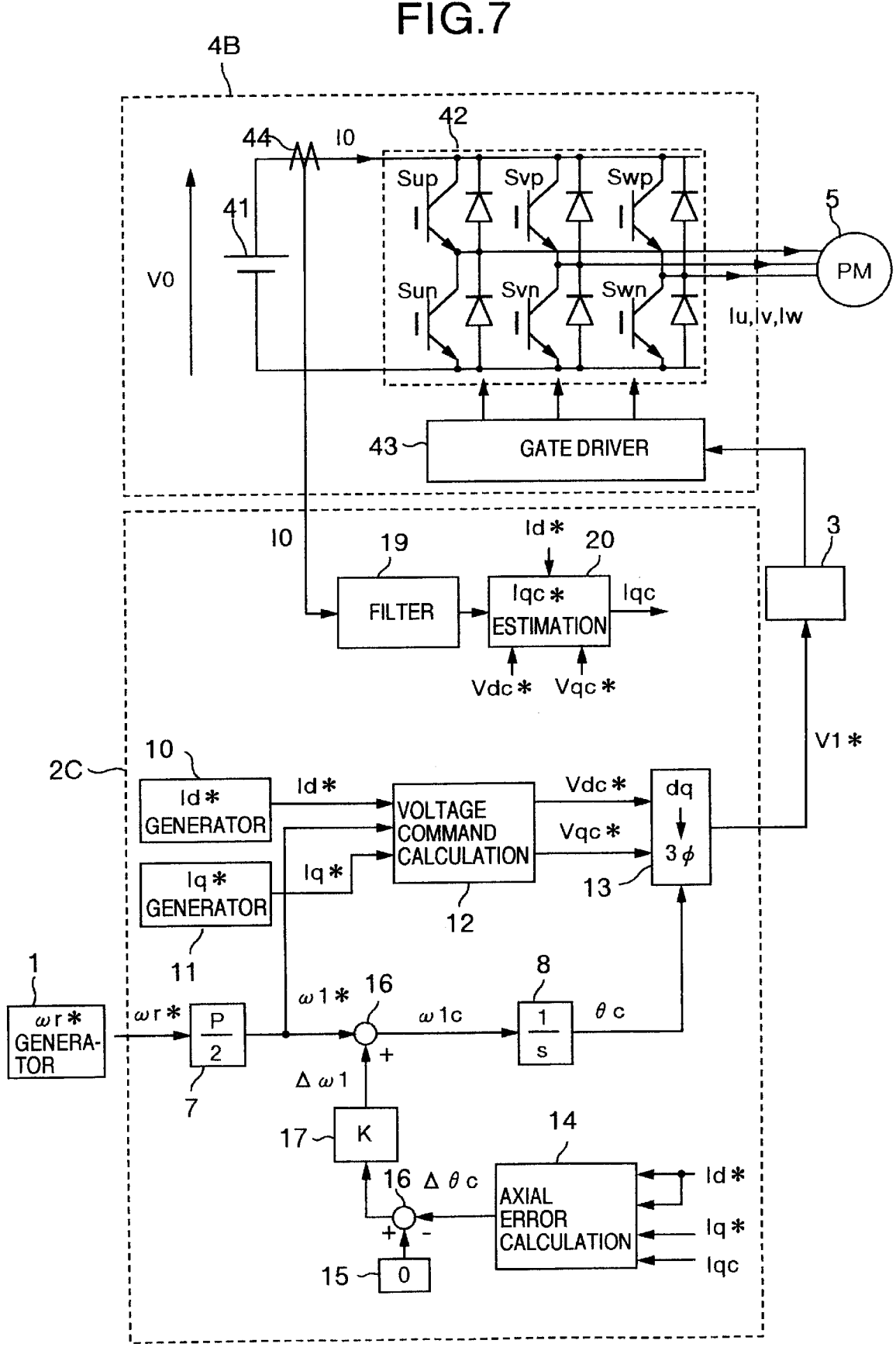
FIG. 7 is a block diagram showing a configuration of a synchronous motor driving system according to a third embodiment of the present invention.

FIG. 7 is a block diagram showing a configuration of a synchronous motor driving system according to a third embodiment of the present invention, which is provided to solve the problems of the second embodiment. The synchronous motor driving system of the third embodiment includes a control unit 2C, a filter 19 for removing a pulsation component contained in a DC current I0, and an Iqc estimator 20 for estimating a q axis current Iqc on a control axis.

The third embodiment of FIG. 7 is substantially similar in system configuration to the second embodiment of FIG. 5. However, the synchronous motor current estimator 18 of FIG. 5 is removed and, instead, the filter 19 and the Iqc estimator 20 are added.

In the control unit 2C, compared with the first embodiment of FIG. 1, the dq coordinate converter 9 is removed, and a system configuration is employed, where Idc and Iqc are not calculated from a synchronous motor current.

Instead, Iqc necessary for control is obtained by using the Iqc estimator 20. No detection/estimation of Idc is carried out. Accordingly, an axial error calculator 14 estimate an axial error $\Delta\theta$ according to the equation (7) without using Idc.

Next, description is made of an operation principle for the filter 19 and the Iqc estimator 20. The filter 19 removes a PWM pulse component from a DC current I0, and extracts an average value of I0. This filter is provided for the purpose of removing a carrier frequency component. Accordingly, a cutoff frequency of the filter only needs to be set equal to about 1 of several, or 1 of several tens of a carrier frequency. Thus, an effect of ringing following switching can be completely removed. As a result, from an output of the filter 19, a DC current I0 having a higher harmonic wave removed is obtained. The Iqc estimator 20 estimates Iqc by using the current I0 having the higher harmonic wave removed.

Next, description is made of a principle of the Iqc estimation. A relation between a voltage/current on a d-q axis of the synchronous motor, and a DC power supply voltage V0 and the DC current I0 of an inverter is represented by an equation (8) with regard to power.

[Equation 8]

$$I_0 V_0 = \frac{3}{2}(V_d I_d + V_q I_q)$$

A coefficient 3/2 in the right side represents a coefficient when relative conversion is used as d-q coordinate conversion. In the case of absolute conversion, the coefficient becomes 1. Since the right side of the equation (8) is established in any coordinate, a relation on a dc-qc axis can be represented by an equation (9).

[Equation 9]

$$I_0 V_0 = \frac{3}{2}(V_{dc} I_{dc} + V_{qc} I_{qc})$$

Assuming that the inverter is ideal, Vdc and Vqc can be replaced by Vdc* and Vqc*, and voltage commands can be used instead. Iqc obtained from the equation (9) is represented by an equation (10).

[Equation 10]

$$I_{qc} = \frac{\frac{2}{3} I_0 V_0 - V_{dc}^* I_{dc}}{V_{qc}^*}$$

In the equation (10), since Idc cannot be detected, if a command value Id* is used instead, a relation is represented by an equation (11).

[Equation 11]

$$I_{qc} = \frac{\frac{2}{3} I_0 V_0 - V_{dc}^* I_d^*}{V_{qc}^*}$$

When the Idc is replaced by Id*, an estimation error may be slightly increased. However, since a q axis (qc axis) is dominant in an output of the synchronous motor, no large errors are generated. The Iqc estimator estimates Iqc by using calculation of the equation (11). A DC voltage V0 may be directly detected by using a sensor. However, if fluctuation in a DC voltage is small, a set value (command value) of the DC current can be used.

In addition, since the equation (8) is a relational equation when conversion efficiency of the inverter is assumed to be 1, the estimated value includes an error due to the assumption. Thus, to increase accuracy of estimation, Iqc may be estimated by considering the conversion efficiency of the inverter.

According to the third embodiment, without using any current sensors of the synchronous motor, it is possible to achieve a synchronous motor driving system of a vector control sensorless system, which is simpler in configuration, and higher in performance.

Fourth Embodiment

Figure 8:
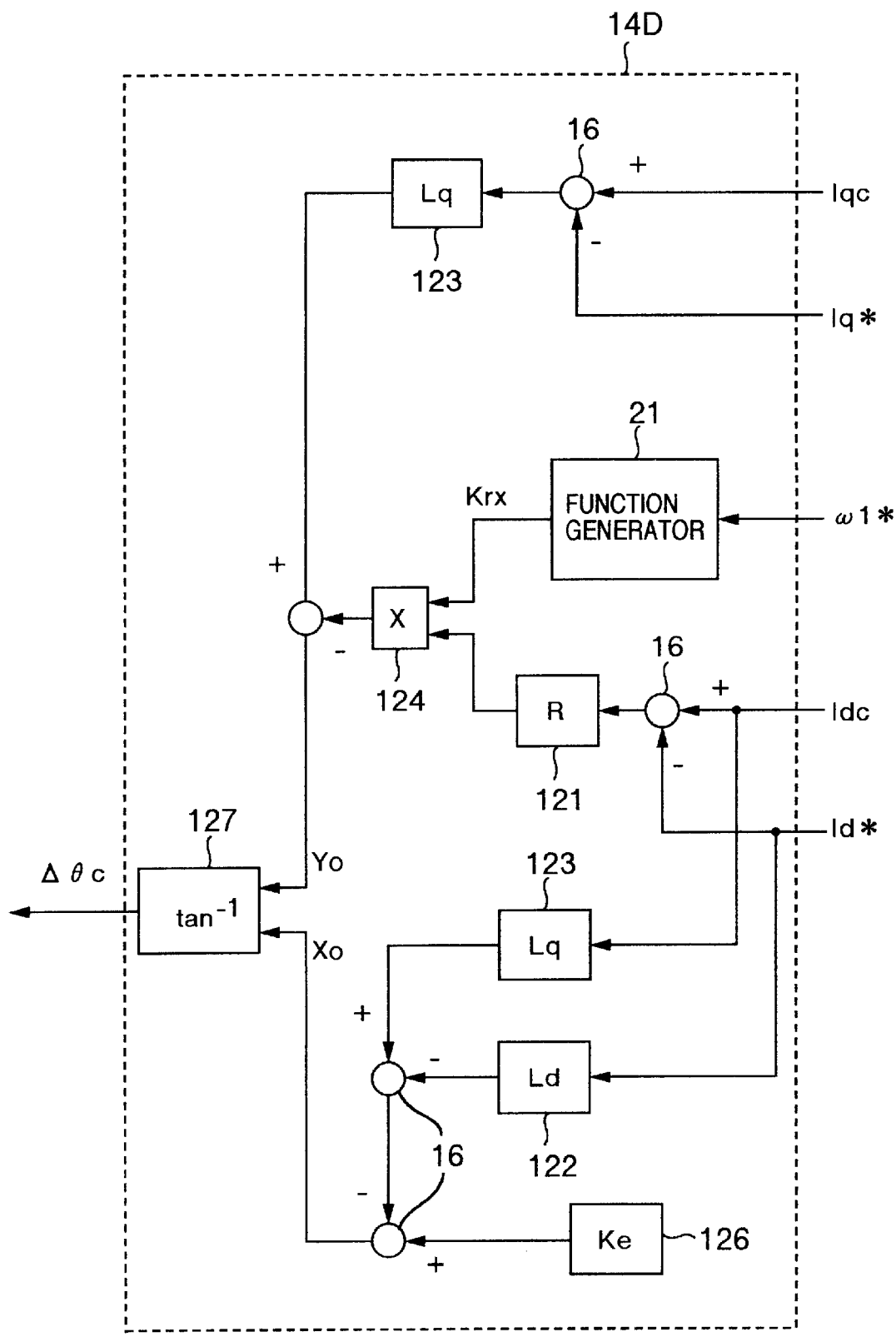
FIG. 8 is a block diagram showing an internal configuration of an axial error calculator 14D in a synchronous motor driving system according to a fourth embodiment of the present invention.
Figure 9:
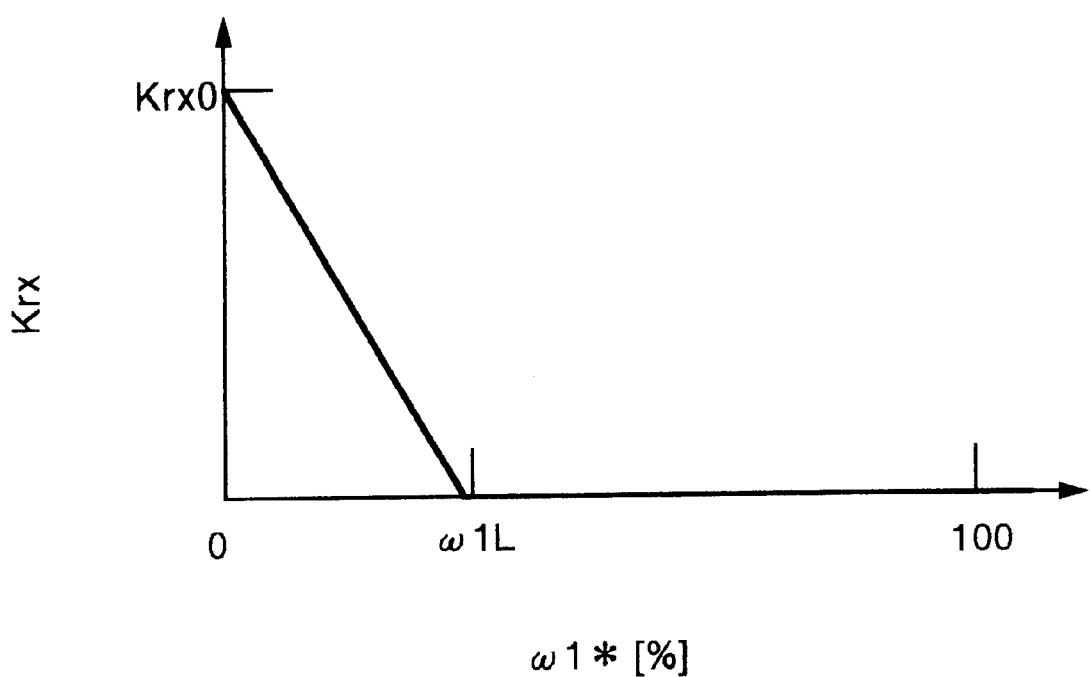
FIG. 9 is an explanatory view showing an operation of a function generator in the synchronous motor driving system of the fourth embodiment of the present invention.

FIG. 8 is a block diagram showing an internal configuration of an axial error calculator 14D in a synchronous motor driving system according to a fourth embodiment of the present invention. In the fourth embodiment, instead of the axial error calculator 14 in the first or third embodiment, the axial error calculator 14D including a function generator 21 for generating a function shown in FIG. 9 is used.

Axial error calculation of the present invention can be achieved by removing the R term of the equation (4) as described above. In this method of calculation, when a rotational speed was extremely low, i.e., 1 to 2% or lower, there was a possibility of an error generated in a result of axial error calculation. Thus, the equation of calculation is corrected in order to increase accuracy of axial error calculation in a very low speed zone. By modifying the equation (4), a relation is represented by an equation (12).

[Equation 12]

$$\Delta\theta = \tan^{-1} \frac{L_q(I_{qc} - I_q^*) - \frac{R(I_{dc} - I_d^*)}{\omega_1}}{K_e - (L_q I_{dc} - L_d I_d^*) - \frac{R(I_{qc} - I_q^*)}{\omega_1}}$$

In the equation (12), it can be understood that as $\omega_1$ is smaller, an effect of an R term is larger.

However, direct use of the equation (12) may cause a considerable increase in a calculation error when $\omega_1$ is very small. In a worst case, division by zero may even occur. Thus, the equation (12) is modified as follows:

[Equation 13]

$$\Delta\theta = \tan^{-1} \frac{L_q(I_{qc} - I_q^*) - K_{rx}(\omega_1)(I_{dc} - I_d^*)}{K_e - (L_q I_{dc} - L_d I_d^*)}$$

Since a term of Ke is dominant in denominator term of the equation (12), correction is made only for a numerator by a function Krx.

FIG. 9 illustrates an operation of a function generator in the synchronous motor driving system of the fourth embodiment of the present invention. A function Krx is set, for example, similar to that shown in FIG. 9. In a region where $\omega 1^*$ is equal to/higher than $\omega 1L$, Krx=0 is set, and a term for R is removed. Only when $\omega 1^*$ is equal to/lower than $\omega 1L$, axial error calculation is corrected to increase accuracy of axial error estimation. However, a function Krx at time of $\omega 1^*=0$ is limited to a finite value (Krx0), and problems of calculation such as division by zero are prevented. As a result, even in the very low speed zone, it is possible to increase the accuracy of axial error calculation, and achieve a synchronous motor driving system of a vector control sensorless system in a wider range.

Fifth Embodiment

Figure 10:
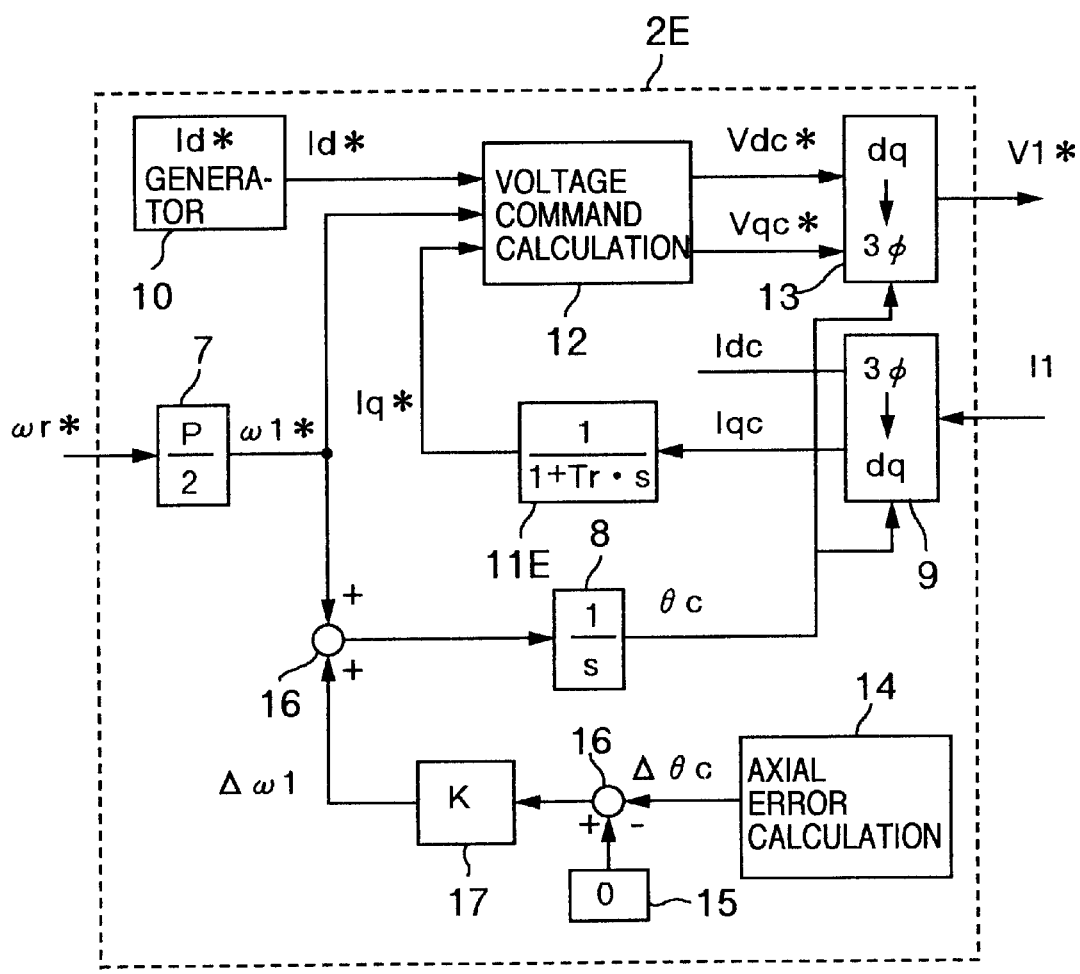
FIG. 10 is a block diagram showing an internal configuration of a control unit 2E in a synchronous motor driving system according to a fifth embodiment of the present invention.

FIG. 10 is a block diagram showing an internal configuration of a control unit 2E in an synchronous motor driving system according to a fifth embodiment of the present invention. In the fifth embodiment, instead of the Iq* generator 11 for supplying a current command Iq* of a q axis component (torque component) of the synchronous motor, an Iq* generator 11E is provided. The Iq* generator 11E of the fifth embodiment calculates a q axis current command Iq* based on a detected current value Iqc.

In the case of vector control, it is always necessary to control a voltage applied to the synchronous motor and a current of the synchronous motor to a relation represented by the equation (2). Id* has no direct relation to a load on the synchronous motor, and thus can be set to an optional value. On the other hand, Iq* must be properly changed according to load torque, and a rotational speed.

In a stationary state, a relation of Iq*=Iqc must always be set. Otherwise, an axial error $\Delta\theta$ is left, making it impossible to establish vector control. According to the fifth embodiment of the present invention, by an extremely simple system configuration, Iq* can be matched with Iqc. The Iq* generator 11E calculates an equation (14). Here, a code Tr denotes a time constant; and s Laplacian operator.

[Equation 14]

$$I_q^* = \frac{1}{1 + T_r \cdot s} \cdot I_{qc}$$

The equation (14) represents a first order lag element and, in principle, a stationary value of Iqc is set as Iq*. Accordingly, Iqc=Iq* is established at the end, establishing vector control.

A current command in normal control is supplied before a real detected current value, and the detected value is matched with the current command. However, in the system configuration of FIG. 10, different from the normal case, a command is later matched with a necessary current value, i.e., an actually flowing current value, and thereby balance is kept between a voltage and a current.

By using the control unit of FIG. 10, there are two places where control constants are adjusted, i.e., a magnetic pole axis estimation gain 17, and the time constant of the equation (14). The system configuration is thus simplified greatly, realizing vector control. Moreover, since the axial error calculator 14 enables high-performance control to be achieved in range of substantially all speeds, there is problem of system switching for each speed zone, and it is possible to achieve a synchronous motor driving system of a vector control sensorless system having the number of places to be adjusted set to a minimum.

Figure 11:
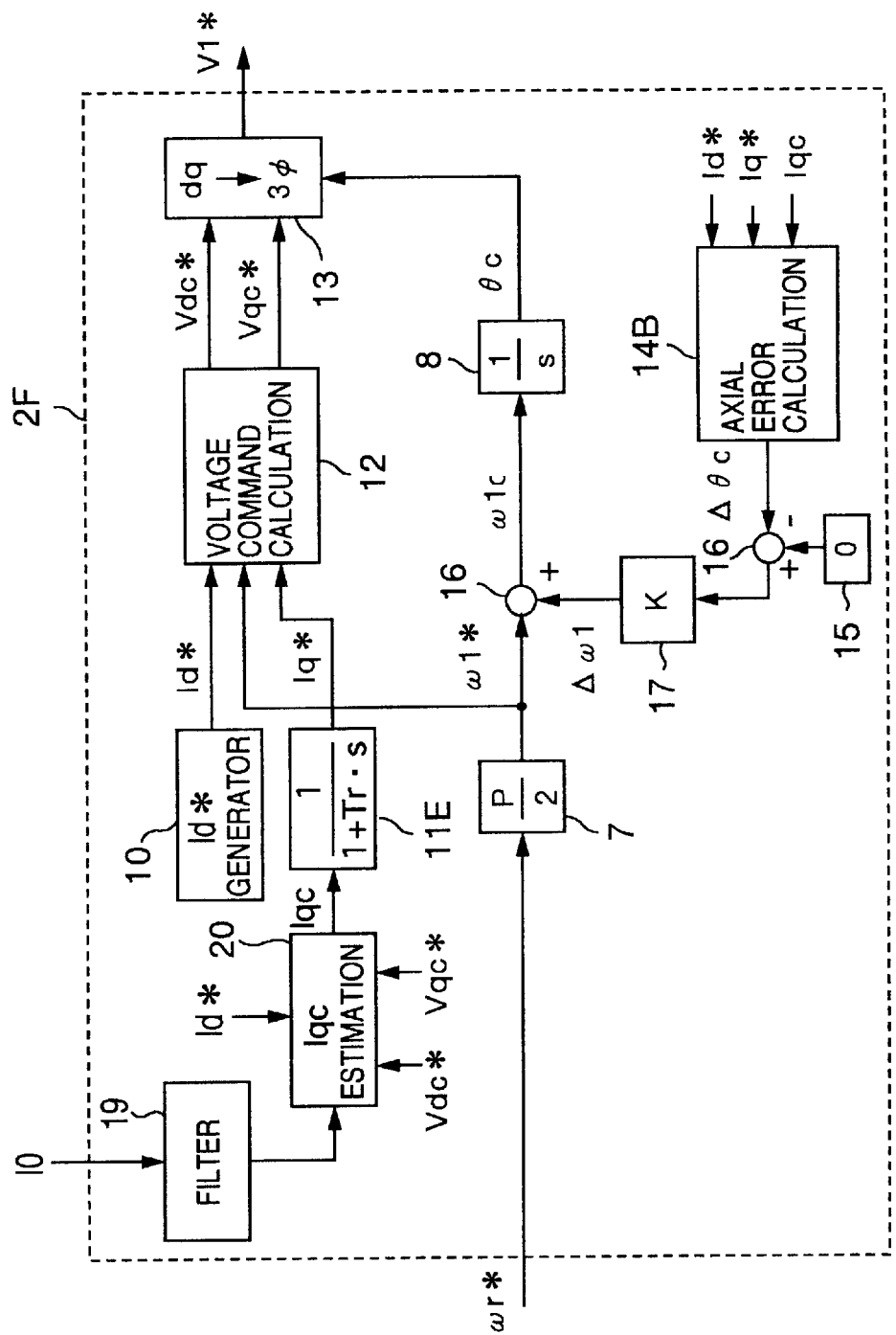
FIG. 11 is a block diagram showing an internal configuration of a control unit 2F when the synchronous motor driving system of the fifth embodiment of the present invention is applied to the third embodiment shown in FIG. 7.

FIG. 11 is a block diagram showing an internal configuration of a control unit 2F when the synchronous motor driving system of the fifth embodiment of the present invention is applied to the third embodiment of FIG. 7. In FIG. 11, an Iq* generator 11E fetches an estimated detected current value not from the dq coordinate converter 9 of FIG. 10 but from the Iqc estimator 20 of FIG. 7. Also in this case, a q axis current command Iq* is calculated based on a detected current value Iqc. Thus, by a simpler system configuration, it is possible to achieve a synchronous motor driving system of a vector control sensorless system.

Sixth Embodiment

Figure 12:
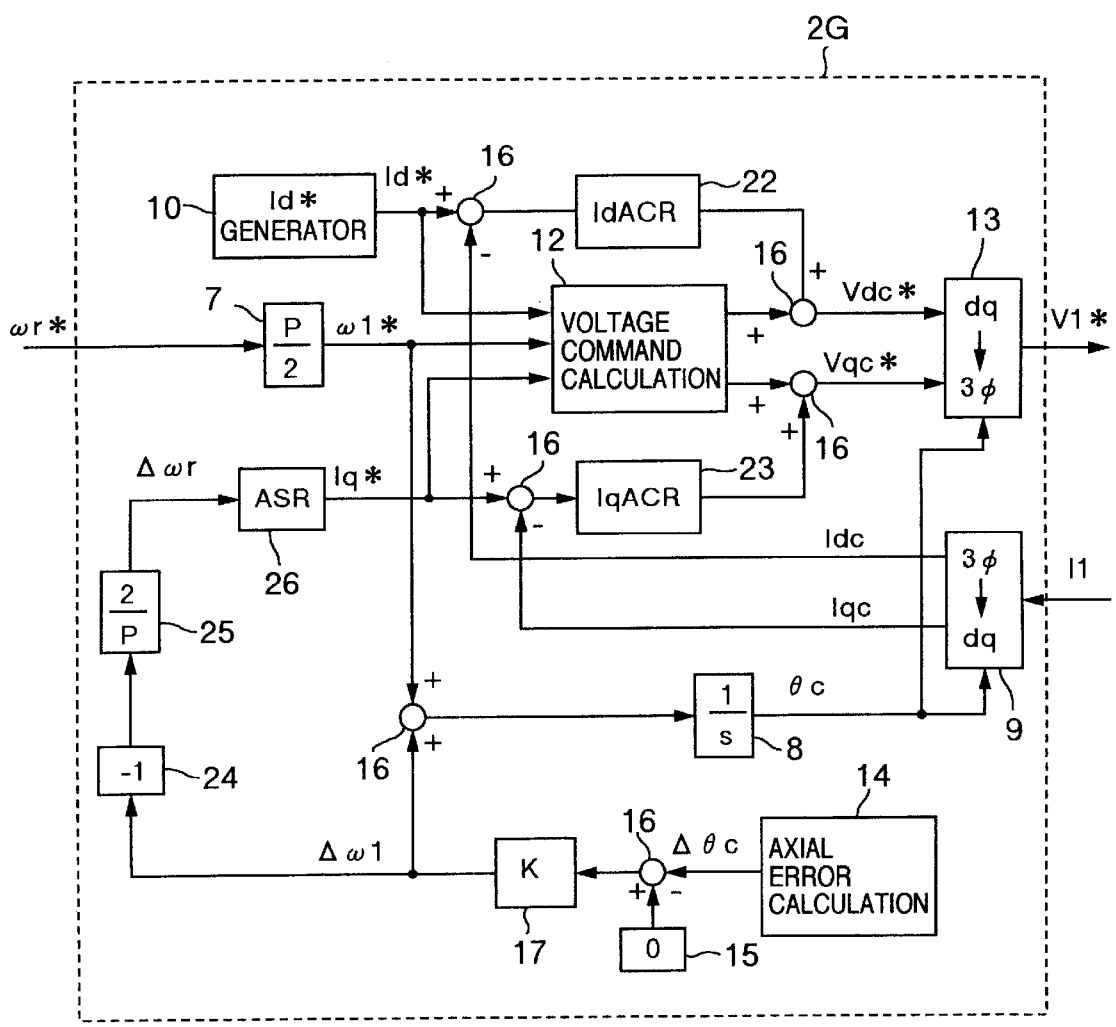
FIG. 12 is a block diagram showing an internal configuration of a control unit 2G in a synchronous motor driving system according to a sixth embodiment of the present invention.

FIG. 12 is a block diagram showing an internal configuration of a control unit 2G in a synchronous motor driving system according to a sixth embodiment of the present invention. The control unit 2G of the sixth embodiment includes an Id current control unit 22 for controlling a d axis current, an Iq current control unit 23 for controlling a q axis current, a code inverter 24 for inverting a code of $\Delta\omega 1$, a conversion gain 25 for converting $\Delta\omega 1$ into speed deviation with P set as a pole of the synchronous motor, and a speed control unit 26 for setting speed deviation to zero.

As described above with reference to the fifth embodiment, in the vector control, making of a current command Iq* is extremely important. In the fifth embodiment, since a current command Iq* is obtained from a real detected current value (estimated value), it is very easy. However, high-speed response to speed or load fluctuation is difficult.

On the other hand, by using the control unit 2G shown in FIG. 12, it is possible to achieve a synchronous motor system of a vector control sensorless system capable of making high-speed response.

An output $\Delta\omega 1$ of a magnetic pole axis estimation gain 17 is a corrected speed amount for reducing an axial error to zero. In other words, this output is an amount corresponding to deviation between a real rotational speed command $\omega r^*$ and a real speed $\omega r$. Thus, by supplying Iq* so as to reduce the output $\Delta\omega 1$ to zero, response of the speed control of the synchronous motor can be improved.

The output $\Delta\omega 1$ has its polarity inverted by the code inverter 24, multiplied by 2/P by the conversion gain 25, and speed deviation $\Delta\omega r$ (=$\omega r^*-\omega r$) is obtained. The speed control unit 26 includes a proportional/integration compensation element, and the like, and calculates a torque current command Iq* based on the speed deviation $\Delta\omega r$.

Moreover, to improve a response characteristic of the synchronous motor, current control units 22 and 23 are added to dc, and qc axes, and a current is controlled at a high speed.

As a result, it is possible to achieve a synchronous motor driving system capable of making high-speed response to speed fluctuation, external torque disturbances, and the like. In addition, since an axial error calculator can be applied in a range of substantially all speeds, it is possible to achieve a synchronous motor driving system of a vector control sensorless system having control performance considerably improved compared with the conventional vector control sensorless system.

Seventh Embodiment

Figure 13:
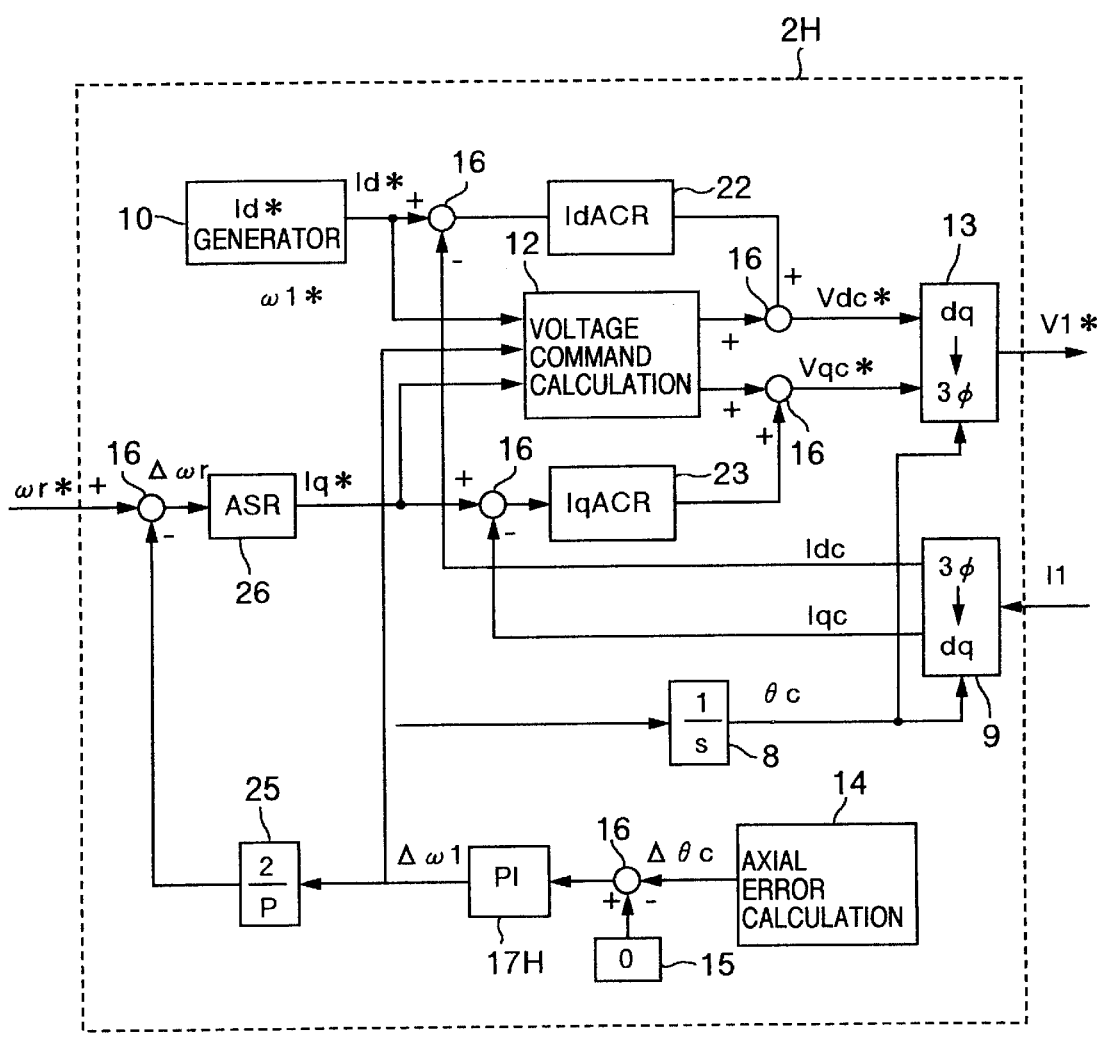
FIG. 13 is a block diagram showing an internal configuration of a control unit 2H in a synchronous motor driving system according to a seventh embodiment of the present invention.

FIG. 13 is a block diagram showing an internal configuration of a control unit 2H in a synchronous motor driving system according to a seventh embodiment of the present invention. In FIG. 13, a magnetic pole axis estimation gain 17H includes a proportion/integration compensation element. The control unit 2H of FIG. 13 is substantially similar in system configuration to the control unit 2G of the sixth embodiment, but different in a method of making $\omega 1$ in the control unit 2H.

In the foregoing first to sixth embodiments, $\omega 1^*$ was directly calculated from the rotational speed command $\omega r^*$, $\Delta\omega 1$ was added, and the driving frequency was corrected.

On the other hand, the seventh embodiment has a feature that an output of a magnetic pole axis estimation gain is set to be ω1, used for control calculation.

A speed control unit 26 calculates Iq* based on deviation Δω between a rotational speed command ωr* and a real speed (estimated value) ωr. The Iq* is compared with a real current value Iqc, and a current is controlled by an Iq current control unit 23 such that both can be matched with each other. When a torque current is actually generated in the synchronous motor, and a rotational speed of the synchronous motor is changed to generate an axial error, an axial error calculator 14 detects this axial error. The magnetic pole axis estimation gain 17H receives the axial error, corrects the ω1 and outputs it.

With the control system constructed in such a manner, it is possible to perform acceleration/deceleration of the synchronous motor by maximum torque. A current to be supplied to the synchronous motor is limited by synchronous motor rating or an inverter capacity. By performing acceleration/deceleration by a maximum condition in this range, it is possible to control the synchronous motor at a highest speed.

Accordingly, a limiter of a maximum current is provided in the Iq* and, in a maximum flowing state of a torque current, the synchronous motor is accelerated. In this case, a speed ω1 must be a speed resulted from application of torque and, different from the case shown in FIG. 12, a speed cannot be provided from a rotational speed command in a feed forward manner. Thus, when the synchronous motor is accelerated/decelerated by maximum torque, the system configuration of FIG. 13 is necessary.

By employing the axial error calculator 14 of the seventh embodiment, it is possible to achieve a high-speed acceleration/deceleration characteristic in a wide range.

The control units 2G and 2H of FIGS. 12 and 13 can be applied to the system of a configuration shown FIG. 5 or 7. If applied to the system configuration of FIG. 5, the control unit only needs to be directly replaced. If applied to the system configuration of FIG. 7, the filter 19 and the Iqc estimator 20 need to be provided in the control unit. However, since Idc cannot be detected in the system configuration of FIG. 7, no Id current control units are installed.

According to the seventh embodiment, it is possible to achieve a synchronous motor driving system having control performance considerably improved compared with a high-performance sensorless system having further improved high-speed responsiveness.

Eighth Embodiment

Figure 14:
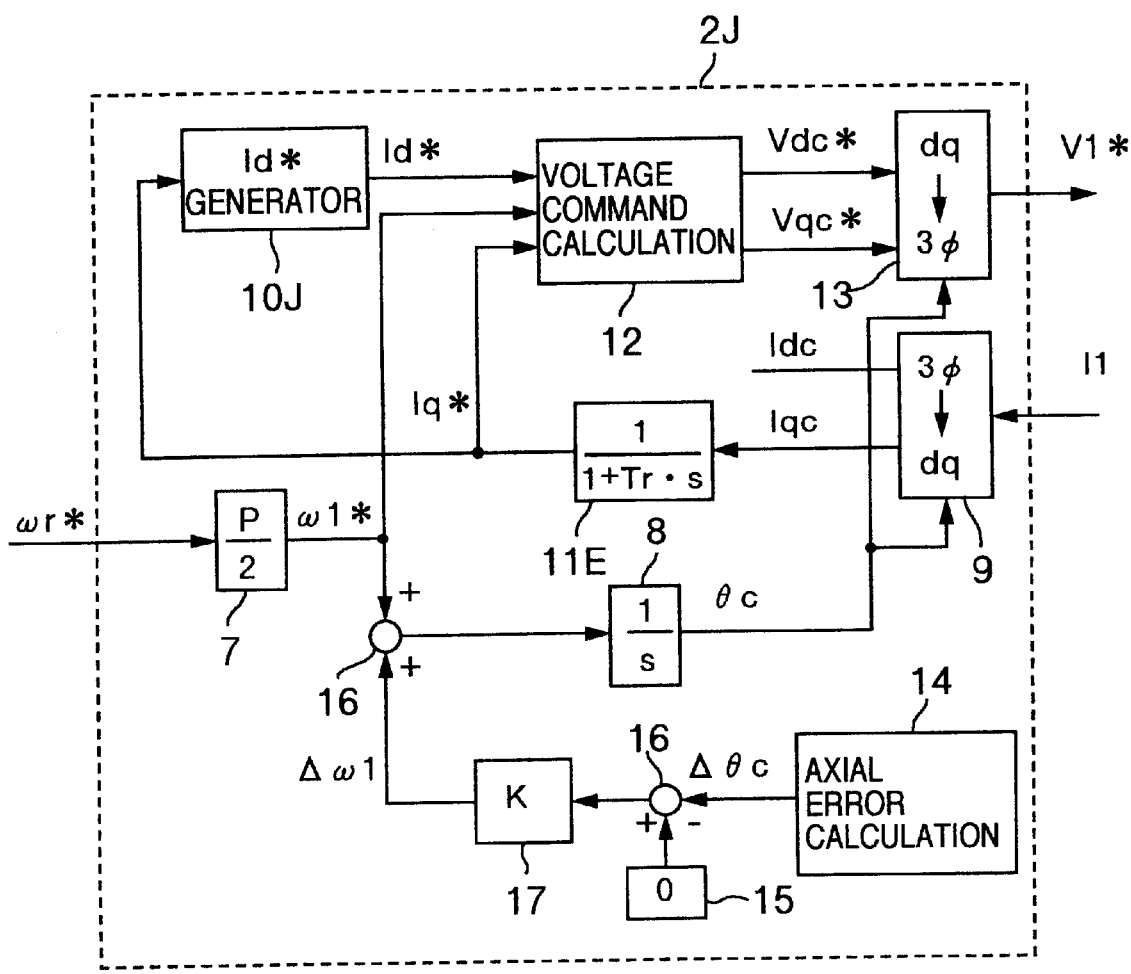
FIG. 14 is a block diagrams showing an internal configuration of a control unit 2J in a synchronous motor driving system according to an eight embodiment of the present invention.
Figure 15:
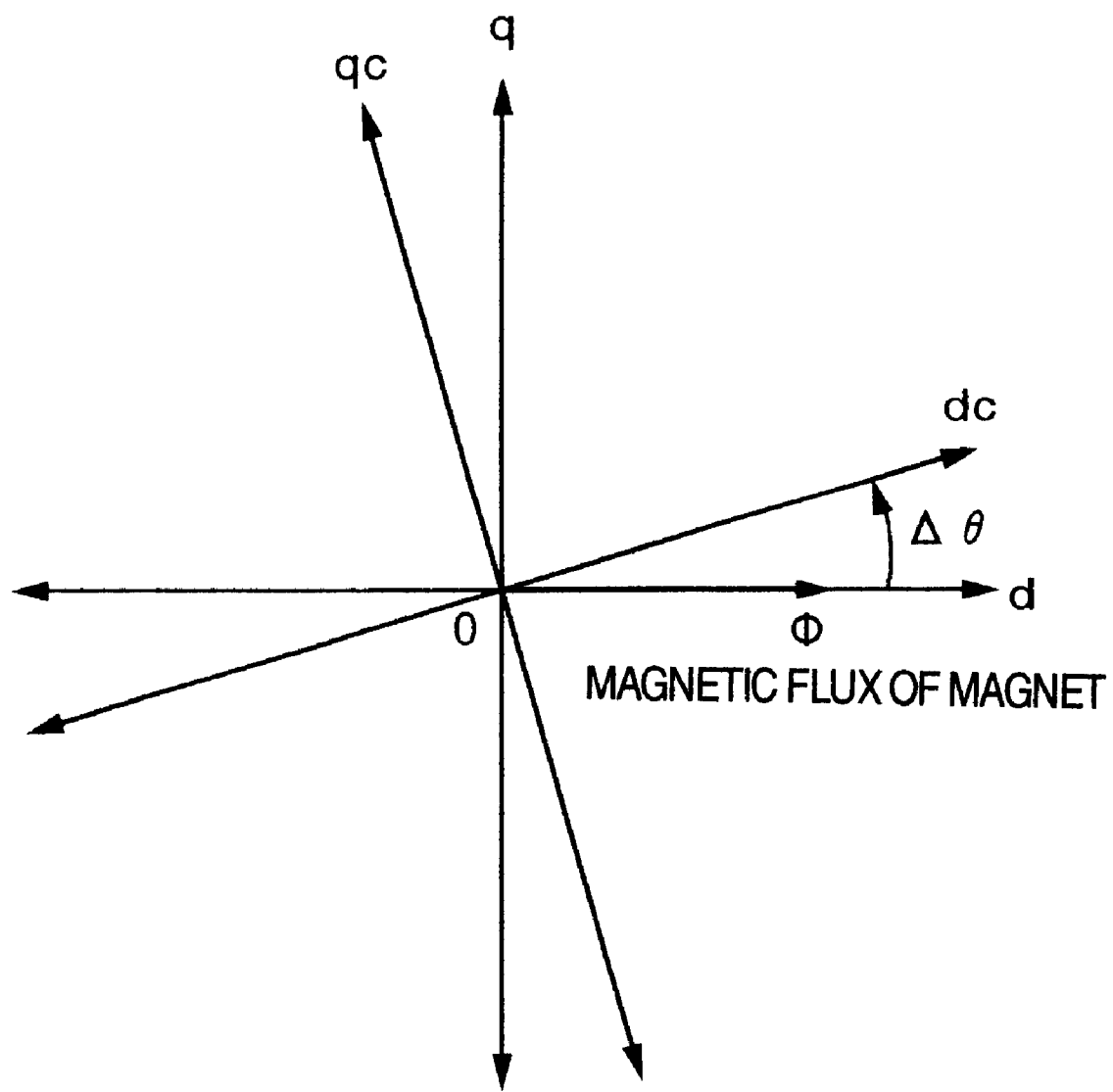
FIG. 15 is a view showing a relation between a d-q coordinate axis with a magnetic pope axis of a synchronous motor set as a reference, and an assumed dc-qc axis on control by a vector.

FIG. 14 is a block diagram showing an internal configuration of a control unit 2J in a synchronous motor driving system according to an eighth embodiment of the present invention. In the eighth embodiment, instead of the Id* generator 10 in the first to seventh embodiments, an Id* generator 10J is used. The Id* generator 10J of FIG. 14 decides a value of Id* based on Iq*. That is, the eighth embodiment is substantially similar to the control unit of the fifth embodiment shown in FIG. 10, but has a feature in a method of making a current command Id*.

Among permanent magnet synchronous motors, there is a type, which generates synchronous motor torque by combining torque generated by a permanent magnet with reluctance torque generated by saliency (reverse saliency) of the synchronous motor. In the case of the synchronous motor of this type, a maximum torque point of the synchronous motor is located in a region where Id is controlled to be a minus value, and control of Id=0 is not advantageous for efficiency. Thus, to drive the synchronous motor by maximum efficiency, the synchronous motor is preferably driven always by maximum torque. Especially, in an industrial/home electric appliance field, energy conservation has been demanded, and maximization of efficiency is an important task.

Conditions for obtaining maximum torque are described in, for example in a document 3: pp. 662–667, "Comparison of Control Characteristics of Permanent Magnet Synchronous Motors with Several Rotor Configurations", JIEE papers D, Vol. 114–6, 1994, or the like. According to an equation (6) of the document 3, a relation is represented by an equation (15). When Iq is set, Id for obtaining maximum torque is decided. However, Φm denotes a magnetic flux of a permanent magnet, and Ld≠Lq is established.

[Equation 15]

$$I_d = \frac{\Phi_m}{2(L_q - L_d)} - \sqrt{\frac{\Phi_m^2}{4(L_q - L_d)^2} + I_q^2}$$

In the eighth embodiment, the Id* generator calculates the equation (15) by using Id*. As a result, it is always possible to drive the synchronous motor by maximum torque (maximum efficiency). For the calculation of the equation (15), Iqc may be used instead of Id*. However, since fluctuation is large in the Iqc during transition, the entire control system may become unstable.

Efficiency maximization can contribute to energy conservation of the apparatus if functioning in s stationary state, and thus use of Iq* as an output of the Iq* generator causes no problems.

Moreover, application of the Id* generator 10J of the eighth embodiment to the other first to seventh embodiments causes no problems.

Thus, by using the eighth embodiment, it is possible to provide a synchronous motor system of a vector control sensorless system, which is capable of operating the synchronous motor by maximum efficiency.

According to the present invention, it is possible to provide the synchronous motor driving system capable of achieving the vector control sensorless system to cover the wide range from the low to high speed zone without any reductions in efficiency or increases in noise. Moreover, irrespective of presence of saliency of the synchronous motor to be controlled, it is possible to achieve the synchronous motor driving system of the high-performance, and highly accurate vector control sensorless system.

It should be further understood by those skilled in the art that the foregoing description has been made on embodiments of the invention and that various changes and modifications may be made in the invention without departing from the spirit of the invention and the scope of the appended claims.

What is claimed is:

1. A synchronous motor driving system which comprises a synchronous motor, an inverter for driving the synchronous motor, a rotational speed command generator for supplying a rotational speed command to the synchronous motor, and a control unit for calculating a voltage applied to the synchronous motor, said synchronous motor driving system comprising
axial error calculation means for estimating an axial error Δθ between a d-q axis and a dc-qc axis by using Ld, Lq, Ke, Id*, Iq*, Idc and Iqc in a range of all rotational speeds except zero of the rotational speed command of the synchronous motor wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, Idc is a detected current value on an assumed dc axis on control, and Iqc is a detected current value on an assumed qc axis orthogonal to the assumed dc axis; and means for adjusting the dc-qc axis to the d-q axis based on the calculated value of the axial error Δθ.

2. The synchronous motor driving system according to claim 1, wherein the axial error calculation means is means for calculating an axial error Δθ in accordance with an equation (1) by using current commands Id* and Iq* on the d-q axis, and detected current values Idc and Iqc on the dc-qc axis, wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, Idc is a detected current value on an assumed dc axis on control, and Iqc is a detected current value on an assumed qc axis orthogonal to the assumed dc axis:

[Equation 1]

$$\Delta\theta = \tan^{-1}\frac{L_q(I_{qc} - I_q^*)}{K_e - (L_q I_{dc} - L_d I_d^*)}.$$

3. The synchronous motor driving system according to claim 1, further comprising means for detecting a DC current on a power source side of the inverter, and synchronous motor current estimating means for estimating an AC current of the synchronous motor based on the detected DC current and a driving pulse signal for driving the inverter, the axial error Δθ being calculated using the estimated current as a detected current value.

4. The synchronous motor driving system according to claim 1, further comprising means for detecting a DC current on a power source side of the inverter, and Iqc estimating means for estimating a current value on the qc axis of the synchronous motor based on the detected DC current, and a detected value or a set value of a DC voltage of the inverter, the axial error Δθ being calculated using the estimated current as a detected current value.

5. The synchronous motor driving system according to claim 1, further comprising a correction term for making correction in accordance with a rotational speed command of the synchronous motor in the calculation of the axial error Δθ, said correction term being a function of weight which increases as the rotational speed command approaches zero.

6. The synchronous motor driving system according to claim 1, wherein the current command Iq* on the q axis is made based on the detected current value or the estimated value on the qc axis.

7. The synchronous motor driving system according to claim 1, wherein the current command Iq* on the q axis is made based on the detected current value or the estimated value on the qc axis.

8. The synchronous motor driving system according to claim 1, further comprising means for estimating a speed deviation between the rotational speed command and a real rotational speed based on the calculated value of the axial error Δθ, the q axis current command Iq* of the synchronous motor being made based on the estimated value of the speed deviation.

9. The synchronous motor driving system according to claim 6, wherein the current command Id* of the d axis is made based on the current command Iq* of the q axis.

10. The synchronous motor driving system according to claim 7, wherein the current command Id* of the d axis is made based on the current command Iq* of the q axis.

11. The synchronous motor driving system according to claim 8, wherein the current command Id* of the d axis is made based on the current command Iq* of the q axis.

12. The synchronous motor driving system according to claim 1, wherein said synchronous motor is of a non-salient type.

13. A synchronous motor driving system which comprises a synchronous motor, an inverter for driving the synchronous motor, a rotational speed command generator for supplying a rotational speed command to the synchronous motor, and a control unit for calculating a voltage applied to the synchronous motor, said synchronous motor driving system comprising:

axial error calculator for estimating an axial error Δθ between a d-q axis and a dc-qc axis by using Ld, Lq, Ke, Id*, Iq*, Idc and Iqc in a range of all rotational speeds except zero of the rotational speed command of the synchronous motor wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, Idc is a detected current value on an assumed dc axis on control, and Iqc is a detected current value on an assumed qc axis orthogonal to the assumed dc axis; and a circuit for adjusting the dc-qc axis to the d-q axis based on the calculated value of the axial error Δθ.

14. The synchronous motor driving system according to claim 13, further comprising a detector for detecting a DC current on a power source side of the inverter, and a synchronous motor current estimator for estimating an AC current of the synchronous motor based on the detected DC current and a driving pulse signal for driving the inverter, the axial error Δθ being calculated using the estimated current as a detected current value.

15. The synchronous motor driving system according to claim 13, further comprising:

a detector for detecting a DC current on a power source side of the inverter, and an Iqc estimator for estimating a current value on the qc axis of the synchronous motor based on the detected DC current, and a detected value or a set value of a DC voltage of the inverter, the axial error Δθ being calculated using the estimated current as a detected current value.

16. The synchronous motor driving system according to claim 13, further comprising a correction term for making correction in accordance with a rotational speed command of the synchronous motor in the calculation of the axial error Δθ, said correction term being a function of weight which increases as the rotational speed command approaches zero.

17. The synchronous motor driving system, according to claim 13, wherein the current command Iq* on the q axis is made based on the detected current value or the estimated value on the qc axis.

18. The synchronous motor driving system according to claim 13, further comprising an estimator for estimating a speed deviation between the rotational speed command and a real rotational speed based on the calculated value of the axial error $\Delta\theta$, the q axis current command Iq* of the synchronous motor being made based on the estimated value of the speed deviation.

19. The synchronous motor driving system according to claim 13, further comprising an estimator for estimating a rotational speed of the synchronous motor based on the calculated value of the axial error $\Delta\theta$, the q axis current command Iq* of the synchronous motor being made based on a deviation between the estimated value and the rotational speed command.

20. The synchronous motor driving system according to claim 17, wherein the current command Id* of the d axis is made based on the current command Iq* of the q axis.

21. The synchronous motor driving system according to claim 18, wherein the current command Id* of the d axis is made based on the current command Iq* of the q axis.

22. The synchronous motor driving system according to claim 19, wherein the current command Id* of the d axis is made based on the current command Iq* of the q axis.

23. The synchronous motor driving system according to claim 13, wherein said synchronous motor is of a non-salient type.

24. The synchronous motor driving system according to claim 13, wherein the axial error calculation means is means for calculating an axial error $\Delta\theta$ in accordance with an equation (1) by using current commands Id* and Iq* on the d-q axis, and detected current values Idc and Iqc on the dc-qc axis, wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, Idc is a detected current value on an assumed dc axis on control, and Iqc is a detected current value on an assumed qc axis orthogonal to the assumed dc axis:

[Equation 1]

$$\Delta\theta = \tan^{-1} \frac{L_q(I_{qc} - I_q^*)}{K_e - (L_q I_{dc} - L_d I_d^*)}.$$

25. The synchronous motor driving system according to claim 13, wherein the axial error calculation means is means for calculating an axial error $\Delta\theta$ in accordance with an equation (1) by using current commands Id* and Iq* on the d-q axis, and detected current value Iqc on the dc-qc axis, wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, and Iqc is a detected current value on an assumed qc axis orthogonal to an assumed dc axis on control:

[Equation 1]

$$\Delta\theta = \tan^{-1} \frac{L_q(I_{qc} - I_q^*)}{K_e - (L_q I_{dc} - L_d I_d^*)}.$$

26. The synchronous motor driving system according to claim 1, wherein the axial error calculation means is means for calculating an axial error $\Delta\theta$ in accordance with an equation (1) by using current commands Id* and Iq* on the d-q axis, and detected current value Iqc on the dc-qc axis, wherein Ld is an inductance on a magnetic pole axis d, Lq is an inductance on a q axis orthogonal to the magnetic pole axis d, Ke is a generated power constant of the motor, Id* is a current command of the d axis, Iq* is a current command on the q axis, and Iqc is a detected current value on an assumed qc axis orthogonal to an assumed dc axis on control:

[Equation 1]

$$\Delta\theta = \tan^{-1} \frac{L_q(I_{qc} - I_q^*)}{K_e - (L_q I_{dc} - L_d I_d^*)}.$$

* * * * *